(12) United States Patent
Musunuri et al.

(10) Patent No.: US 12,288,984 B2
(45) Date of Patent: Apr. 29, 2025

(54) SYSTEMS, DEVICES AND METHODS FOR POWER MANAGEMENT AND POWER ESTIMATION

(71) Applicant: Infineon Technologies AG, Neubiberg (DE)

(72) Inventors: Surya Kiran Musunuri, Bangalore (IN); Eswar Goda, Bangalore (IN)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 18/488,077

(22) Filed: Oct. 17, 2023

(65) Prior Publication Data

US 2024/0047966 A1 Feb. 8, 2024

Related U.S. Application Data

(63) Continuation of application No. 17/583,246, filed on Jan. 25, 2022, now Pat. No. 11,831,159.

(51) Int. Cl.
*G06F 1/3206* (2019.01)
*H02J 3/00* (2006.01)

(52) U.S. Cl.
CPC ............ *H02J 3/003* (2020.01); *G06F 1/3206* (2013.01); *G05B 2219/21013* (2013.01)

(58) Field of Classification Search
CPC ................... H02J 3/003; G06F 1/3206; G05B 2219/21013
See application file for complete search history.

(56) References Cited

U.S. PATENT DOCUMENTS

2018/0321980 A1* 11/2018 Lo ............................. G06N 7/01
2019/0187775 A1* 6/2019 Rotem .................... G06F 1/324

* cited by examiner

*Primary Examiner* — Gary Collins
(74) *Attorney, Agent, or Firm* — VIERING, JENTSCHURA & PARTNER mbB

(57) ABSTRACT

A microcontroller includes a plurality of (Intellectual Property) IP blocks each configured to perform one or more functions; a hardware power estimator circuit for estimating power of the microcontroller, the hardware power estimator including a hardware artificial neural network including a plurality of interconnected nodes arranged in one or more stages, wherein each individual stage comprises: a first input layer including values indicating activities of the microcontroller and/or indicating active cells of the microcontroller; a second input layer including a weighted set of values; an output layer including values calculated for the individual node stage; and at least one intermediate layer situated between the input layer and the output layer, wherein each node of the at least one intermediate layer comprises a multiply and adder (MADD) circuit that is configured to calculate a value for the respective node using values received from the first and second input layers.

20 Claims, 16 Drawing Sheets

400

| PD1 | PD2 | PD3 | .. | PDn |
|---|---|---|---|---|
| IP1 $(v_1, f_1)$ | IP5 $(0, 0)$ | IP2 $(0, 0)$ | .. | SS1 $(v_4, f_3)$ |
| IP4 $(v_2, f_2)$ | SS0 $(v_4, f_4)$ | SS3 $(0, 0)$ | .. | IP5 $(v_2, f_4)$ |
| IP3 $(v_3, f_3)$ | SS2 $(v_0, f_0)$ | .. | .. | .. |

| CLK\PD | PD1 | .. | PDn |
|---|---|---|---|
| CLKD1 | LTR1 | .. | LTRn |
| .. | .. | .. | .. |
| CLKDm | LTR5 | .. | LTR7 |
| All | LTRk | .. | LTR7 |

| Control Scheme\Load Range (A) | 0-0.1 | 0.1-0.5 | 0.5-2 | 2-5 |
|---|---|---|---|---|
| Current Mode | - | - | Ipcm1 | Ipcm2 |
| Feed-forward | Ipff1 | Ipff2 | Ipff3 | - |
| Hysteretic | Iphy | - | - | - |
| Voltage Mode | - | Ipvm1 | - | - |

600b

| Control Scheme\Load Range (A) | 0-0.1 | 0.1-0.5 | 0.5-2 | 2-5 |
|---|---|---|---|---|
| Current Mode | - | - | Ipcm1 | Ipcm2 |
| Feed-forward | Ipff1 | Ipff2 | Ipff3 | - |
| Hysteretic | Iphy | - | - | - |
| Voltage Mode | - | Ipvm1 | - | - |

600c

| 31:29 | 28:24 | 23:0 | | | |
|---|---|---|---|---|---|
| Control Scheme | RSVD | Loop Parameters | | | |
| Feed Forward | RSVD | Gain <23:16> | Beta<15:8> | Reff <7:4> | Ceff<3:0> |

FIG. 6

SYSTEMS, DEVICES AND METHODS FOR POWER MANAGEMENT AND POWER ESTIMATION

CROSS-REFERENCE TO RELATED APPLICATIONS

This is a continuation of U.S. patent application Ser. No. 17/583,246, filed on Jan. 25, 2022, the entire contents of which are incorporated herein by reference.

TECHNICAL FIELD

Various embodiments generally relate to system-on-chips (SoCs) or microcontrollers and power management thereof.

BACKGROUND

Power consumption by embedded devices is an important criterion for extending battery life and also reducing the environmental impact of a system. Power estimation, at system level, is becoming a complex problem—whether it is an IoT application involving many embedded devices, automotive applications such as the engine control and powertrain, or industrial applications with sensors. For example, automotive microcontrollers incorporate accelerators that have very high variability of dynamic power consumption depending on the configuration (and data pipeline) of such IPs.

Currently, power aware designs and technologies use inputs based on accurate pre-silicon power consumption are used in modern SOCs. These techniques need to be utilized at silicon/hardware level to manage system power more efficiently. Estimating the dynamic power consumption in run time allows faster and better power management schemes to be utilized in a given system.

Further, estimating the power consumption for complete system, e.g., a microcontroller unit (MCU) or SoC can include a summation of all individual components, with a real time OS/software running on complex hardware, which leads to global optimization of power/energy consumption.

Optimizing the power consumption for always-on/connected devices leads to overall energy savings of the system. With the increase of edge computing requirements, microcontrollers (uCs) and microprocessors (uPs) used in these devices incorporate several accelerators, connectivity Intellectual Properties (IPs) or IP blocks. Typical use cases require activation of these IPs only for a certain duration. Therefore, dynamic power management schemes are critical for optimizing energy consumption in these systems. However, with a wide range of power consumed by these IPs, more sophisticated power management techniques are needed.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which:

FIGS. 4-5 each shows a table representing constraint data.

FIG. 6 include tables showing control schemes and parameters according to exemplary embodiments of the present disclosure.

DESCRIPTION

Figure 1A:
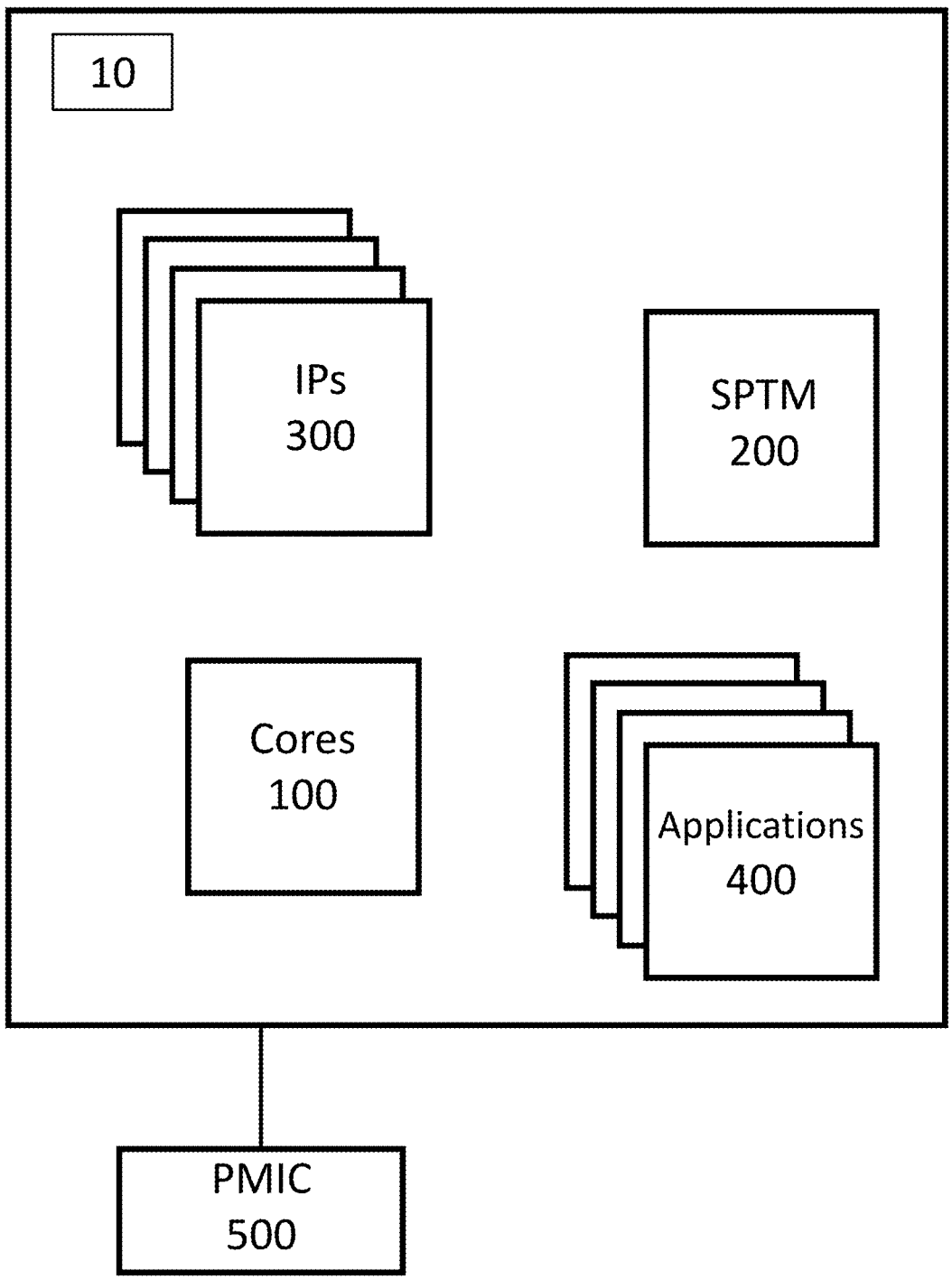
FIGS. 1A-1B each include a diagram illustrating an exemplary microcontroller unit according to at least one exemplary embodiment of the present disclosure.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (o)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component," "system," "circuit," "element," "interface," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Unless specifically stated otherwise, discussions herein using words such as "processing," "computing," "calculating," "determining," "presenting," "displaying," or the like may refer to actions or processes of a machine (e.g., a computer/processor/etc.) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Exemplary embodiments of the present disclosure may be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

FIG. 1A includes a diagram illustrating a microcontroller or microcontroller unit (MCU) 10 according to one or more exemplary embodiments of the present disclosure. The MCU or microcontroller 10 includes one or more cores 100, a system power transient management component 200, an intellectual property (IP) blocks 300, and one or more other applications 400. Other components may be included but are not shown. Connections are between the components of the microcontroller 10 may be assumed although are not depicted in FIG. 1A.

The MCU 10 can include or be coupled to a power management integrated circuit (PMIC) 500. That is, in some cases, the PMIC 500 may internal and reside within the MCU 10. In other instances, including in the example of FIG. 1, the PMIC 500 can be external to the MCU 10. In the external case, both the MCU 10 and PMIC 500 may be implemented as part of a SoC.

Figure 1B:
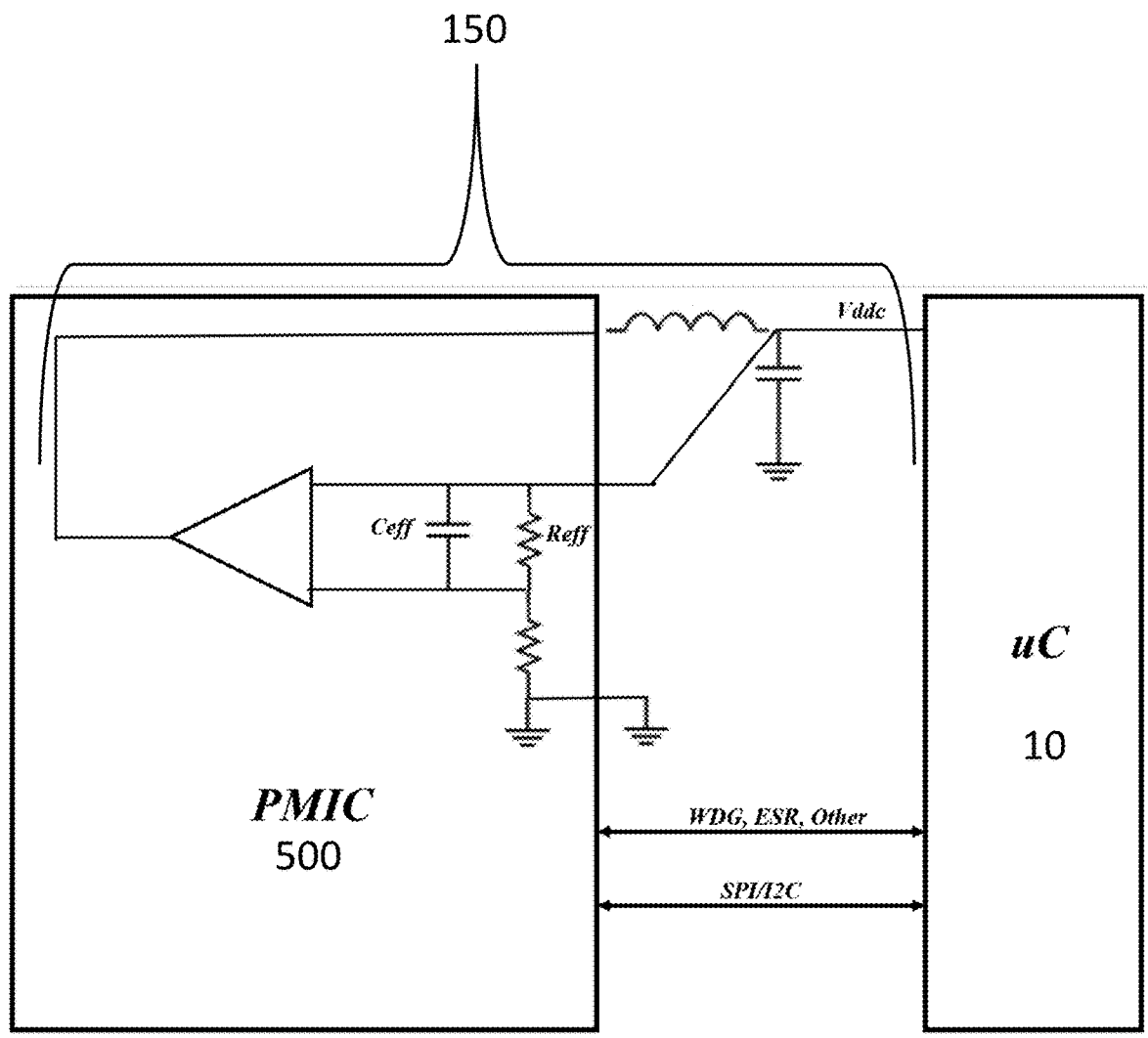

FIG. 1B shows one example of a connection between the PMIC 500 and the MCU 10. In the example of FIG. 1B, the PMIC 500 implements a buck converter with a feedforward control loop. Different control loop variation or implementations are possible and can be realized for a given type of power regulator (LDO, buck converter, etc) used with the PMIC 500.

Further, different types of communication interfaces, such as Serial Peripheral Interface (SPI), I2C, or etc. can be used to communicate the power control data (control state (cs) frequency parameters, voltage parameters), between the MCU 10 and PMIC 500. In general, the MCU determines the or refines the parameters to be used or implemented by the PMIC 500.

Referring to FIG. 1A, the one or more cores 100 may be processor or central processing unit (CPU) cores. The one or more cores 100 can perform one or more operations by executing program instructions or software. For example, the applications 400 may be in the form of instructions that are to be performed by the one or more cores. Instructions or software described herein may be stored or located on a (non-transitory) computer readable storage medium located in the microcontroller 10 or SoC, or is otherwise accessible to the cores 100.

An Intellectual Property (IP) block 300 may refer to a reusable element of logic, circuitry, software, or chip layout. An IP block or IP may support multiple functions, in some cases, implemented by one or more devices included in the IP block and/or may be implemented, at least in part, by the one or more processor cores.

Figure 2:
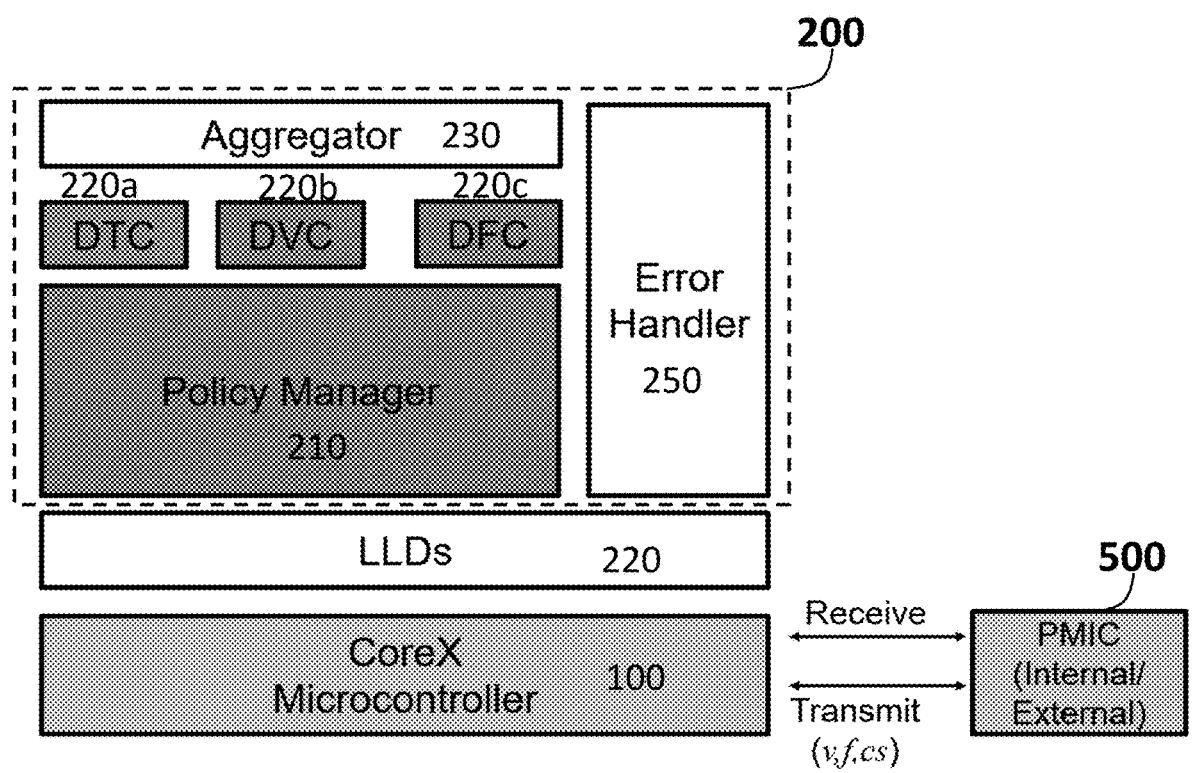
FIG. 2 is a block diagram of a system power transient management component according to at least one exemplary embodiment of the present disclosure.

FIG. 2 is a block diagram showing a more detailed look of a system power transient management component or "SPTM" 200 according to at least one embodiment of the present disclosure. The SPTM 200 can be realized or implemented using embedded software running on a processing core 100 (e.g., one or more "first" cores) of a microcontroller 10. The SPTM 200 may implement one or more processes or techniques and utilize specific hardware along with software to improve the overall system power performance. The other or "second" cores can run or implement other applications or application tasks, and access or interface with IPs (e.g., accelerators, peripherals, etc.).

For purposes of explanation, it may be assumed, unless otherwise noted, that the first core or "Core 0" can be configured to control voltage (v), frequency (f) and control states (cs) of the corresponding to respective power domains of the MCU 10. The voltage, frequency can correspond to the supply voltage and frequency provided for a particular domain, while the control state can correspond to the control scheme/power mode and feedback loop parameter used in the power regulator for that particular power domain. A power domain may apply to a particular subset of one or more particular IPs.

As shown in FIG. 2, the SPTM 200 can include a Dynamic Transient Control (DTC) 220a, a Dynamic Voltage Control (DVC) 220b, and a Dynamic Frequency Control (DFC) 220c block. DVCs and DFCs are can be implemented as known in the art. The DTC 220 block is configured to utilize application information in order to optimize the performance of the MCU 10.

The SPTM 200 includes an Aggregator 330 configured to generate a consolidated output from the 3 schemes (e.g., DVC, DFC and DTC). An Error Handler 350 is included to poll for relevant events, alarms or other artefacts in the system and takes or initiates appropriate action.

The SPTM 200 includes a Policy Manager 210 which is an entity or component configured to decide on or determine various parameters. In particular, the Policy Manager 210 is configured to determine parameters to determine power control data or power control schemes to be used or implemented by the PMIC 500 for power management. The Policy Manager 210 can operate or use several different inputs 370 for determining the parameters for SPTM 200.

Figure 3:
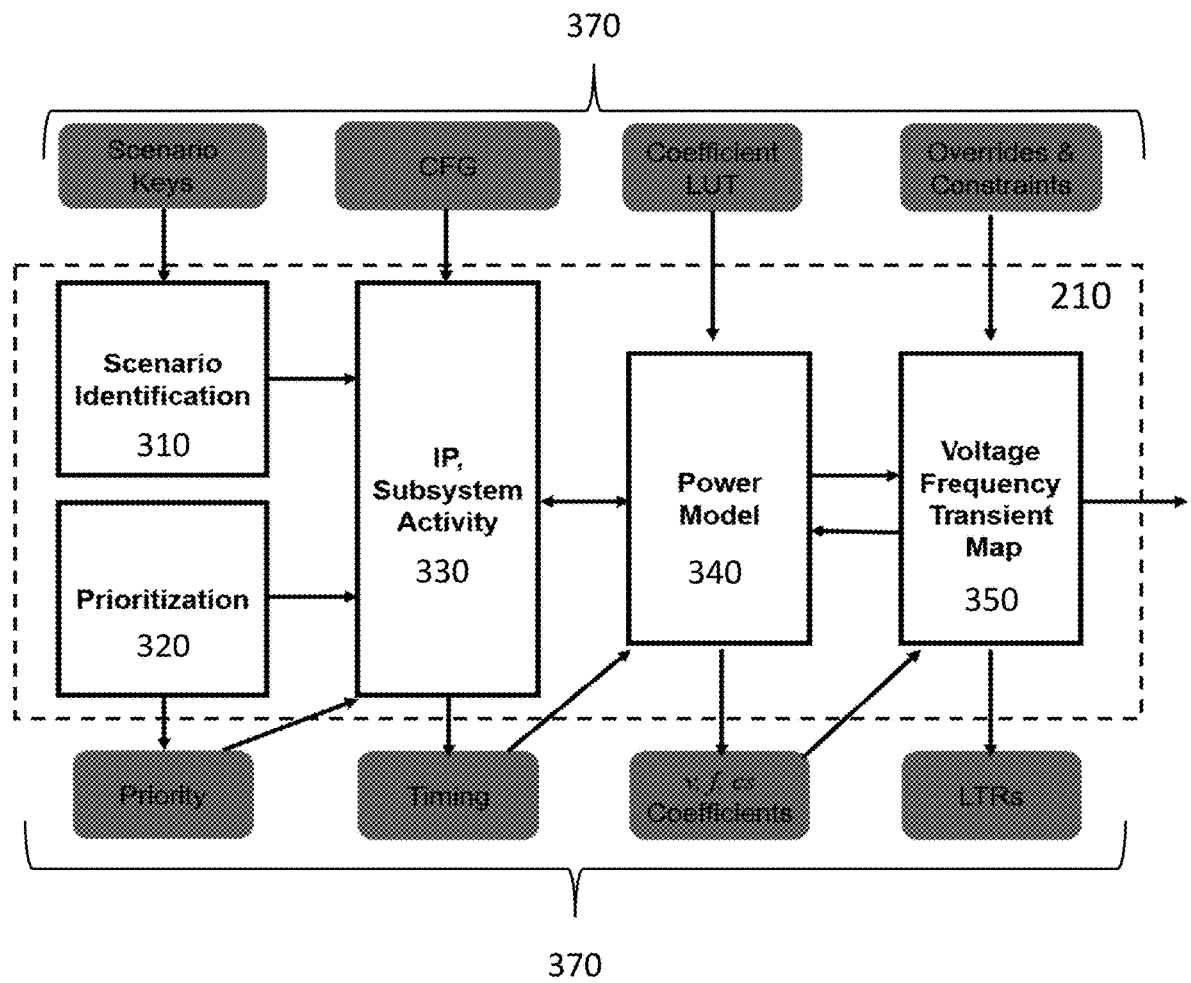
FIG. 3 shows an example of the Policy Manager of a system power transient management component according to at least one exemplary embodiment of the present disclosure.

FIG. 3 shows an example of the Policy Manager 210 according to at least one embodiment of the present disclosure. The Policy Manager 210 includes several functional components or blocks, namely, a Scenario Identification 310, a Prioritization 320, an IP Subsystem Activity 330, a Power Model, and a Voltage Frequency Transient Map 350 blocks.

The Scenario Identification 310, based on the requirements of the applications 400, can identify or determine various likely possible scenarios to be performed by MCU 10 upfront or in advance. Application information can be used by the Scenario Identification 310 to identifies the one or more likely scenarios. For instance, inputs 370 can be scenario keys or scenario identification information can be captured and stored in certain registers, e.g., hardware (HW) registers which are then accessed and used by the Scenario Identification 310 to identify one more scenarios. The Scenario Identification 310 can forward or send the one or more determined scenarios (scenario data), to the IP Activity component 330.

The Prioritization (component) 320 of the Policy Manager 210 can be configured to access and/or determine priority regarding tasks or activities to be performed by the MCU 10. The information may be contained or captured in some hardware (HW) registers. The Prioritization 320 can identify and forward the relevant priority information or priority data to the IP Activity component 330. As such, if there is any indicated precedence or prioritization between scenarios or their activities, then this information can be provided to and used as an input by the IP activity block 330.

The identified scenarios can be associated or linked with certain (pre-defined) activities, e.g., IP activities. The IP Activity can be configured to determine the IP activities to be implemented or realized for scenarios by the Scenario Identification 3210. The IP activities may be stored or captured as data in configuration (CFG) registers. As such, the determined one or more scenarios can be expanded into a series or set of IP Activities by IP Activity block 330. Further priority data can be used by the IP Activity 330 to assign priorities or precedents to the activities.

The IP Activity block 330 can also receive as input, timing or timing constraint data. That is, in the MCU 10, timing constraint data may exist and be stored for the IP activities. The timing constraint data can indicate minimum or maximum activity periods for each activity. Further, the timing constraint data to be provided to the IP Activity Block 330 may be updated depending based on identified scenarios and priority data. For example, the IP Activity Block can access timing registers based on the selected scenario. The timing registers can define software anchors, which are memory locations that exist before and indicate occurrence of upcoming respective IP activities.

The obtained activities or identifies scenarios along with the corresponding priority info, and timing constraint data can be used as input into a Power Model component 340. The Power Model 340 can be configured to apply a mathematical power model to estimate power consumption for each of the IP activities of the determined one or more scenarios. Some examples of power models are shown or described herein.

The Power Model 340 can be configured to receive or obtain certain inputs or coefficients from registers of the MCU based on its input to compute the estimate power consumption for each activity. As a result, a dynamic current consumption profile can be calculated for the one or more determined scenarios.

Further, the power estimate (dynamic current consumption) determined by the Power Model 340 can be dynamically updated or changed to reflect changes in inputs. For example, as the one or more scenarios progresses to runtime execution, the Power Model 340 can update the coefficients used in the power model calculation. In one example voltage (e.g., measured by local voltage monitor) and current consumption can be acquired.

The calculated current consumption or the calculated dynamic current profile information can be subsequently used to determine power control data, e.g., voltage, frequency and control states to meet the overall (voltage, frequency, and transient performance characteristics). The dynamic current profile may be used with constraints, expressed or specified in corresponding registers.

In the example of FIG. 2, the Voltage Frequency Transient Map (VF™) 350 can be used to determine the power control data using the dynamic current profile information. The VFTM 350 can be a data structure, e.g., a look-up table (LUT) and be configured to take as an input the dynamic current profile information to output or provide control power data, which is to be communicated to the PMIC 500. Additional input to be used by the VFTM 350 can include constraints data specified in one or more registers. In one instance, the VFTM 350 can obtain for input, latency time response(s) (LTR) data for corresponding voltage, frequency, control state change operations. The LTR data can be captured or stored in LTR register(s). For example, once the computation or determination of power control data includes or leads to changes in the implemented control state, the feedback loop of the power converter from the PMIC 500 takes times to converge the loop response, and this information is captured in LTR. Using this data can allow the VTM 350 to produce a more optimal or better parameters or power control data to be implemented. The MCU 10 can include a set of registers are allocated in memory space of the MCU 10 for storing the voltage, frequency, LTR and control state constraints. These registers may or can be updated after every cold power-on of the MCU 10 (e.g., usually during or after firmware execution is completed).

Other constraint data may be used for determining certain parameters for the power control data. FIG. 4 shows a table 400 representing constraint data and shows the minimum voltage and minimum frequency supported for specific IPs, subsystems for each power domains (PDs). For example, the first power domain, PD1, covers IP1, IP4, and IP3 the corresponding data in terms of minimum voltage (v) and minimum frequency (f).

Similarly, FIG. 5 shows a table 500 representing latency data and shows the minimum latency of gating (LTR), ungating clocks (CLKS), e.g., within a specific power domain (PD) and gate, ungate of a power domain is captured.

The Policy Manager 210 and the SPTM 200, are configured to optimize the system or MCU 10 level performance of load transients, e.g., by providing power control data or power control parameters to the PMIC 500 so as to tune the loop parameters of voltage regulators on the PMIC 500 as needed.

Table 600a is an exemplary look-up structure that can be used for the VFTM 350. The table 600a shows different possible control schemes or power modes that can used with a PMIC configured or implemented with a buck converter.

The table 600a indicates the responses or the parameters to be implemented with the PMIC 500 based on determined expected transient loads for a given control scheme.

The top row of the table 600a has different ranges of expected transient loads which can be determined as described herein. In the example of table 600a, the expected load transient ranges are grouped into, 0-0.1 Amps (A), 0.1-0.5 A, 0.5-2 A, and 2-5 A. Possible control schemes that may be implemented, e.g., for a buck converter, include a Current Mode, a Feed-forward mode, a Hysteretic Mode, and a Voltage Mode.

The power model 340 determines a dynamic current consumption profile. Using the current consumption profile, which indicates the expected load transients, and based on the current control scheme, the VTM 350 (e.g. using table 600a) is used to determine the appropriate power control data. The determination can produce or indicate the power mode or control scheme to be implemented, and the corresponding loop parameters (lpcml, lpffl, etc.) for an optimum transient load response. The loop parameters may loop parameter for current model control (e.g., lpcm) or a loop parameter for feedforward control (e.g., lpff).

Table 600b is another exemplary look-up structure that can be used for the VFTM 350. The table 600b shows different possible control schemes or power modes that can used with a PMIC configured with a low-dropout (LDO) regulator. Table 600b shows responses or the parameters to be implemented with the PMIC 500 based on determined expected transient loads for a given control scheme.

As described herein, the loop parameters along with the control scheme or power mode can constitute or be considered a Control State (cs). Control state data can be stored or captured in the form of a register value, as show in table 600c of FIG. 6. This table 600c shows one example of a control state for a feedforward power mode or control scheme for a buck converter. The control scheme includes loop parameters including Gain, Beta, Reff, and Ceff. (Gain refers to forward path gain, Beta refers to feedback path gain, Reff* Ceff refers to feedback path pole). Other control schemes can include other suitable loop parameters depending on the feedback loop between the MCU 10 and the PMIC 500.

The power control data, which includes the control state data determined by the VFTM 350 and can further include the voltage and frequency data determined by the DVC and the DFC. The power control data can be aggregated and communicated by the MCU 10 to the PMIC 500. Using the obtained power control data, the power regulation operation provided by the PMIC 500 and the implemented control loop configuration is dynamically updated to optimize power consumption by effectively responding to load transient events/jumps and mitigating its effects so as to improve power consumption and device performance.

Traditional dynamic voltage and frequency control schemes used for system optimization use a power model but only voltage and frequency (VF) map modules. AS such, the objective can be to minimize power consumption on a first power domain, PD1. Then, VF map can easily calculate the optimize power to be:

$$p_{11}v_1f_1 + p_{12}v_2f_2 + p_{13}v_3f_3$$

where the power coefficients, p11, are captured as part of voltage (v) and frequency (f) coefficient registers. If the objective is to calculate the voltage droop due to triggering IP1, which is part of PD1, then the voltage droop can be computed as $$vdroop = r_{11}p_{11}v_1f_1$$

where coefficient, $r_{11}$, is also captured in register. Therefore, voltage on this domain can increased by this amount, vdroop, to mitigate the voltage droop.

In the exemplary SPTMs described herein, changes in the voltage or frequency are not required to respond to load transient events or jumps. Instead, the parameters of the power regulator control loop (loop parameters) and the control scheme or power mode of a PMIC can be caused to be changed dynamically to adjust and optimize for a given transient load jump or change.

Figure 7A:
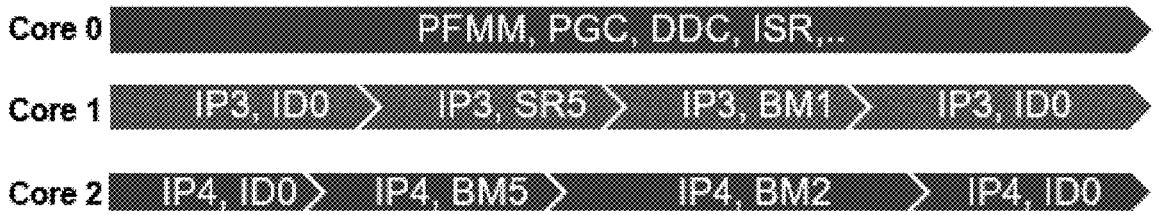
FIG. 7A shows an exemplary activity diagram for a microcontroller according to at least one exemplary embodiment of the present disclosure.

FIG. 7A shows an exemplary activity diagram 700a for the MCU 10 according to at least on exemplary embodiment of the present disclosure. The activity diagram 700a shows activities or application tasks to be implemented on some cores 100 of the MCU 10. Specifically, the activity diagram 700a shows the activities for Core 0, Core 1, and Core 2. As shown in activity diagram 700a, Core 0 implements or executes applications or tasks including the Policy Manager 210 at one or more time instances. In this example, Core 1 implements applications task or routines IP3 while Core 2 implements application tasks or routines from IP4. (Herein and other isntances, the acronyms, ISR (Interrupt service) Routine, SRX, IDx, BMx, MEMTR, etc. refer to software modules or service routines running on a core).

The SPTM 200 of the MCU 10, as described herein, can be configured to reduce energy consumption of the device by optimizing response to load transients. In one example, the SPTM 200 may not require an increase in voltage to mitigate a voltage droop during load transients. Instead the SPTM can be configured to dynamically cause a change to the power mode and associated control/loop parameters.

Figure 7B:
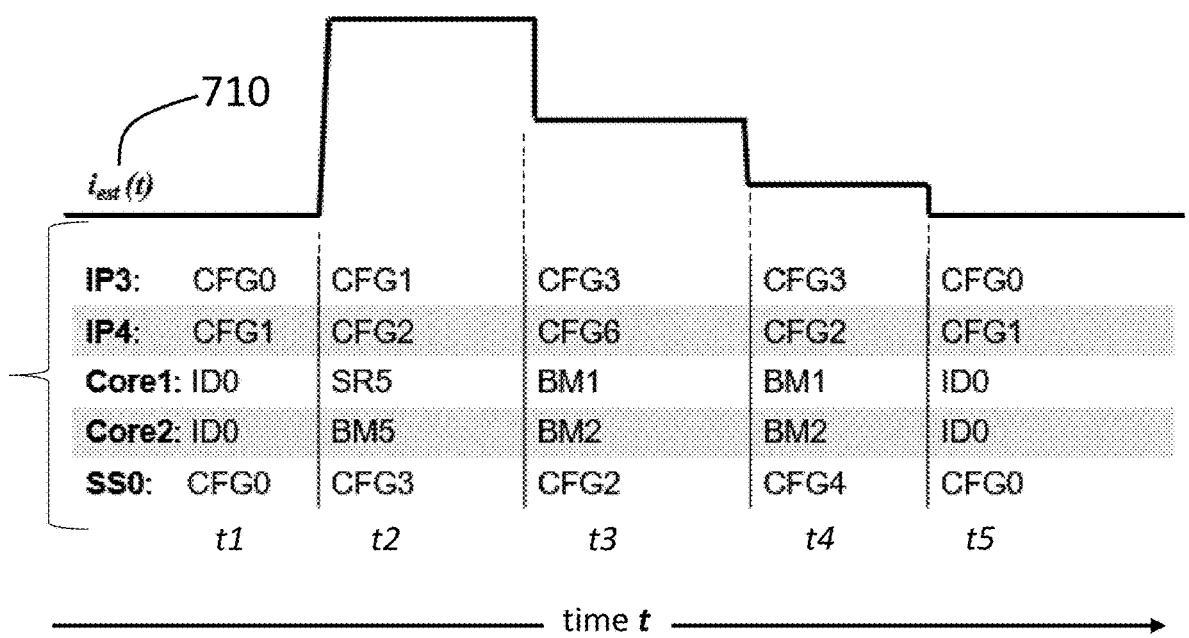
FIG. 7B shows a graph of an estimated dynamic current consumption and a corresponding with a table of activities to be implemented by a microcontroller according to at least one exemplary embodiment of the present disclosure.

FIG. 7B shows a graph 700b showing an estimated dynamic current consumption $i_{est}$ 710 aligned with a table showing the activities to be implemented or performed by various components of the MCU 10. As described herein, the SPTM 200 can identify activities expected to occur in the MCU 10. The table shows the identified activities to be performed for each of the active or relevant components over time. The graph shows the corresponding estimated current consumption over time. For example, at a first time or time period the IP3 is implementing a task or activity identified by configuration 0 (CFG0), the IP4 is implementing a task or activity identified by configuration 1 (CFG1), CORE 1 is implementing . . . , and so on.

As described herein, SPTM 200 can apply the information or data of the identified activities to the Power Model 340 to the identified activities (using any relevant constraints) to determine an expected dynamic power profile. The estimated dynamic current consumption profile indicates expected transient jumps or load transients, including voltage droop.

After using the Power Model 340 to determine the dynamic power profile, the Policy Manager of the SPTM 200, using the VFTM 350, computes power control data. Again the SPTM 200 can determine a power control mode and associated parameters (control loop). The voltage and frequency parameters, determined by the DTC and DTFC, can be provided by the MCU 10 as part of the power control data to the PMIC 500 for minimizing the effects of the expected voltage droop. With this SPTM scheme for dynamic power management, the objective would be to minimize energy consumption by avoiding any change in supply voltage to mitigate voltage droops.

Figure 7C:
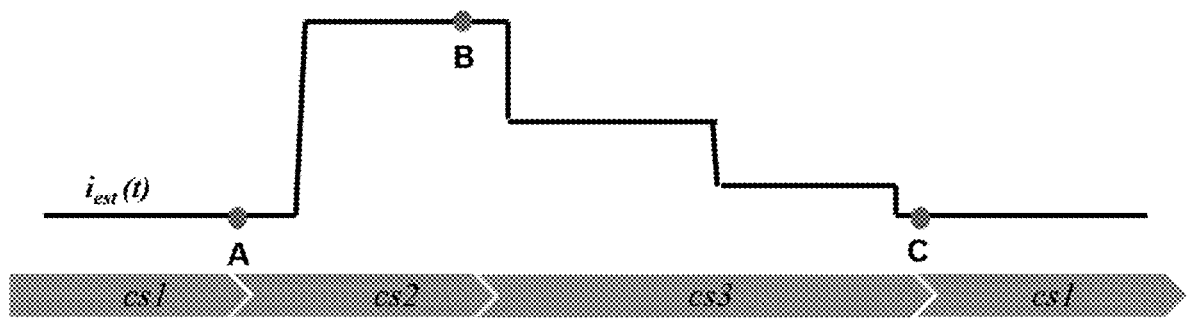
FIG. 7C shows a graph of an estimated dynamic current consumption with software anchors.

The SPTM 200 uses specific scenario information on load jumps by identifying anchors, e.g., software anchors, shown as points A, B, C in FIG. 7C) upfront or beforehand to ascertain the power control data and control states, which are can be communicated to PMIC 500. The PMIC 500 with the dynamic power control data can appropriately respond to the load jumps and optimize power consumption. Software anchors can be places or positions in the application tasks or application code that to be performed or executed prior to a transient load event or transient jump. As shown, the SPTM 200 may determine software anchor points based on the execution or implementation of multiple components, e.g., multiple activities or application tasks to occur at different time instances. The software anchors correspond to time of activities or tasks and can be used for timing when to implement the dynamically determined power control data to mitigate expected load transients.

Figure 8A:
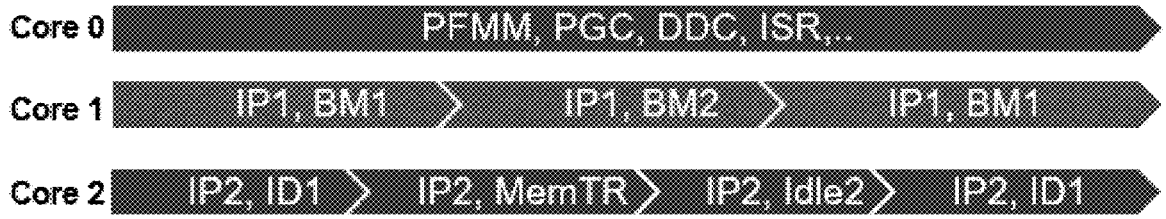
FIG. 8A shows an exemplary activity diagram for a microcontroller according to at least one exemplary embodiment of the present disclosure.

FIG. 8A shows an activity diagram 800a for the MCU 10 according to at least on exemplary embodiment of the present disclosure. The activity diagram 800a shows another set of activities or application tasks to be implemented, e.g., on cores 100 of the MCU 10. In this instance, the activity diagram 800a shows activities for Core 0, Core 1, and Core 2. As in other examples, Core 0 can implements the Policy Manager 210 of the SPTM 200 as described in embodiments herein. Core 1 implements applications task or routines for IP1, while Core 2 implements application tasks or routines for IP2.

Figure 8B:
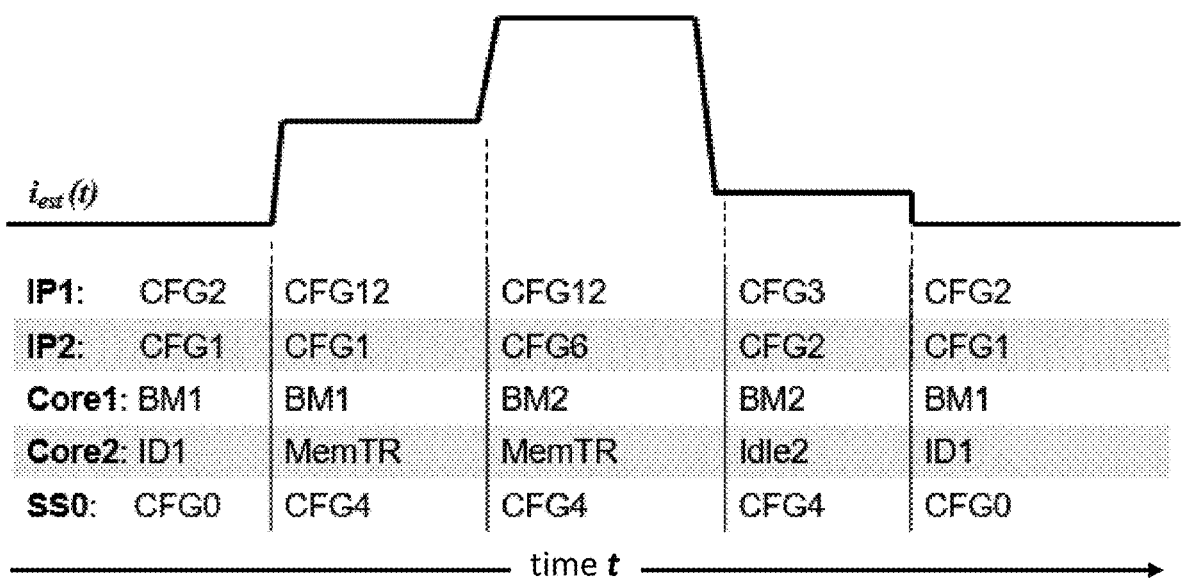
FIG. 8B shows a graph of an estimated dynamic current consumption and a corresponding with a table of activities to be implemented by a microcontroller according to at least one exemplary embodiment of the present disclosure.

FIG. 8B shows a graph 800b showing a current consumption $i_{est}(t)$ 810, over time t which is aligned with a table showing the activities produced or implemented over time t by various components of the MCU 10.

As described herein, the SPTM 200 can be configured to identify, beforehand, IP activities expected to be performed or occur in the MCU 10. That is, the table of 800b shows the activities expected to be performed over time with the graph showing the corresponding estimated current consumption.

In this example, IP1, at a first time or time period is implementing a task or activity identified by configuration 2 (CFG2), IP2 is implementing a task or activity identified by configuration 1 (CFG1), CORE 1 is implementing BM1, and so on.

The SPTM 200 can apply the information or data regarding the identified activities (obtained from registers of the MCU 10) to the Power Model 340 as well as any relevant constraints to determine an expected dynamic power profile. The dynamic power profile can indicate an expected current consumption. As shown, the estimated current consumption $i_{est}(t)$ from the power profile indicates expected transient jumps or load transients, including voltage droop.

Figure 8C:
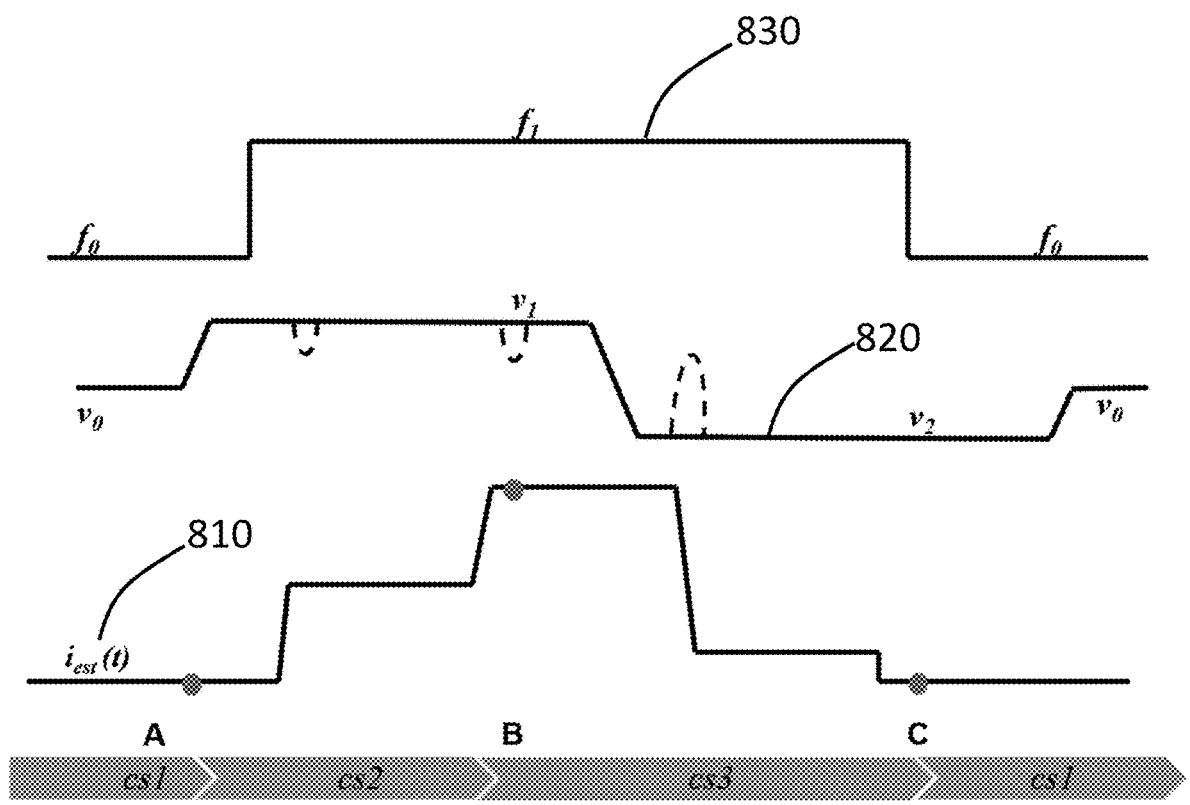
FIG. 8C shows a graph of an estimated dynamic current consumption with software anchors according to at least one exemplary embodiment of the present disclosure.

FIG. 8C shows is a graph including plots of the dynamic current estimation 810, the voltage parameters or voltage response 820 (e.g., determined by the DVC) and the frequency parameters or frequency response 830 (e.g., determined by the DFC).

The MCU 10 through the SPTM 200 identifies anchors using the specific scenario (e.g., IP activity) information. In this example the identified software anchors are located at time or event positions A, B, and C. As shown, the software anchors are loated just prior to expected load transients which can be seen by the jumps in the current consumption plot 810.

Since the knowledge or data of software anchor points (A, B, C) are defined or identified previous to transient load jumps, this information are can be used or communicated to PMIC 500 so that the PMIC can appropriately respond to the load jumps and optimize power consumption using power control data provided by the MCU 10. Again, the SPTM 200 may determine software anchor points based on the execution or implementation of multiple components, e.g., multiple activities or application tasks to occur at different time instances.

The software anchors help in sequencing the voltage, frequency changes along with control state communication to the PMIC. The control state, voltage and frequency are set back to nominal (or pre-defined) values at the end of scenario. There can be a known nominal control state, voltage (V), frequency (F) for a given microcontroller.

According to embodiments herein, SPTM, would be used when a system or microcontroller is in a high activity period. Once the system or microcontroller is back to nominal activity then the control state, V, F can be set back to nominal values until the next high activity phase.

In several cases, the Policy Manager 210 or SPTM 200 may be updated or frequently, such as in order of every 10 to 50 microseconds.

In various embodiments, a sequence of operations or tasks can be performed by the MCU 10 prior to application tasks or IP activities are activated or triggered for a given scenario. The MCU 10 can be configured, using the knowledge of the sequence of operations to ensure that the software anchors will occur before the performance of the IP activities or application tasks that cause the load transient events or jumps.

In various embodiments described herein, a microcontroller is configured to change or update the power mode or control scheme and loop parameters in a PMIC dynamically based on expected load transient requirements. Therefore, this requires upfront load transient estimations, by a policy manager within the microcontroller, and communicating calculated control state(s) (cs), along with voltage/frequency (if necessary), to a PMIC. Once a particular scenario is detected at runtime, the policy manager can choose an appropriate method to control the power consumption of the device or system. This approach can lead to the microcontroller advantageously reducing power consumption or average power consumption.

Further, besides power management, power consumption itself by embedded devices is an important criterion for extending battery life and also reducing the environmental impact of a system. Due to the increased focus on this during system design, power estimation at system level is becoming a complex problem—whether it is an IoT application involving many embedded devices, automotive applications such as the engine control module and powertrain module, or industrial applications with sensors. For example, automotive microcontrollers incorporate accelerators that have very high variability of dynamic power consumption depending on the configuration (and data pipeline) of such IPs.

There has been a shift towards power aware methodologies to integrate a System-on-Chip (SoC). Power aware designs and technologies with inputs based on accurate pre-silicon power consumption are extensively used in modern SOCs. These techniques have to utilized at silicon/hardware level as well to manage system power more efficiently. Estimating the dynamic power consumption in run time allows faster and better power management schemes (such as DVC, DVFS, etc.) to be utilized in a given system. Further, estimating the power for complete system, that is summation of all individual SoCs/ASICs, with real time OS/software running on complex hardware, leads to global optimization of power/energy consumption.

Generally, estimating the average power consumption of microcontrollers and Application Specific Integrated Circuits (ASICs) for specific use cases requires gate-level, Register Transfer Level (RTL) simulations or timing-based activity simulations. Simulation time constraints and complexity of converting user codes into vectors prevent fast estimation of average power consumption for iterative power—performance optimization of complex application use cases. Moreover, due to implementation constraints, it can be impractical to use the same techniques to realize hardware-based power estimators. Hence, modern SoCs and MCUs use power management IP that aggregates various IP logic states to arrive at overall system power states (Deep sleep, sleep, idle, standby, etc). These states are then used by a power management controller to optimize the overall power.

Various embodiments herein depict and describe a hardware based power estimator (HPE) that can estimate the power consumption of the SoC within a few clock cycles, thereby enabling faster dynamic power management. Various embodiments show a HPE which can be used in both pre and post silicon phase using simple multiply and add circuits that can quickly estimate dynamic power consumption in real-time. Power estimation can be based on a profile of each peripheral activated by the actual application usecase (or software). Further, this relies on using pre-silicon analysis for power estimation and enabling optimizing of voltage regulator circuits based on the expected current jumps in the post silicon phase.

In the post silicon phase, once the configuration of the various IPs in a SoC/MCU is known and the dynamic power can be estimated to a reasonable level of accuracy based on previous measurements for the IP. As an example, the current consumed by any IP can be calculated by measuring the difference between the current measured when a SoC level pattern with the IP enabled is run and the current when the same pattern is run with the corresponding IP disabled. Once the IP currents are known, the SoC power consumption can be estimated by implementing a multiply and add circuit for every IP. Further, granularity of the multiply-add (MADD) circuit can be increased to capture the effect of the various configuration of the IP. It is to be noted that an increase in granularity of MADD circuit will increase the accuracy of the estimated power consumption, while also increasing the hardware (silicon area).

In the pre-silicon phase, the dynamic power consumption estimation can be done with the RTL based implementation of the multiply and add circuits. Since, real time estimation is not a constraint in pre-silicon, the estimation of power for a particular application code can be done with a good level of accuracy.

Various embodiments, relate to training a power estimator based on the configuration of each IP, sub-system, SoC or the overall system. Learning algorithms, LMS (least mean squared) multivariate curve fitting (for certain sub-systems or IPs), and neural networks (for other IPs and the complete system-on-chip (SoC)), are used to arrive at coefficients for this estimator (HPE). For example, models for the learning algorithms (Las) can be trained with current measurements from pre-silicon (using simulators such as PrimePower®) or post-silicon (using power supplies). The models can then be validated with an independent set of application code/software. Further, the HPE implementation can be scaled to accommodate an increase in number of IP instances between derivative products (or different architectures). Moreover, HPE includes both leakage and dynamic components of silicon power consumption, and thus accounts for PVTF variations.

In general, for digital logic devices, power consumption includes leakage and dynamic components. Leakage power is generally a function of fabrication process parameters (threshold voltage, mobility, etc) and the voltage. However, the dynamic power is dependent on the switching activity of the logic gates within the integrated circuit logic. Consumption of dynamic power can be written as $$P_{dyn} = V^2 \sum_i f_i \alpha_i C_i \qquad \text{Equation (1)}$$

Where:
- $\alpha$ denotes the activity of a given node/net of the logic circuit,
- C denotes the effective capacitance and f or feff denotes the effective frequency.

Typically, modern silicon designs use several similar cells, called standard cells, across the entire logic design. For example, many state machines would be realized using certain type of flip-flops, each consisting of standard logic gates of certain threshold voltage. Each of the standards cells, for example, can be abstracted for the calculation of dynamic power. In that case, the total dynamic power can be written as $$P_{dyn} = V^2 \sum_p f_{eff,p} N_p C_{eff,p} \qquad \text{Equation (2)}$$

Where
- N denotes the total cells of a particular type (regular threshold voltage, high threshold voltage, NOR gates, etc).

The two equations above for calculating dynamic power can be used together for different parts of digital logic. For example, equation (1) can be used to estimate power consumptions of IPs and sub-systems that have high operating frequency, whereas equation (2) can be used for other logic. Accordingly, the total dynamic power can be calculated as:

$$P_{dyn} = V^2 \sum_i f_i \alpha_i C_i + V^2 \sum_p f_{eff,p} N_p C_{eff,p} \qquad \text{Equation (3)}$$

Modern microcontrollers, or microprocessors can include several million logic gates. Calculating the dynamic power for these millions of logic nodes/nets increases the computational complexity. Provided a finite set of application use cases (and thereby the chip configuration) is known, a configuration based dynamic power for a given cluster of logic can be correlated with aggregate gate based dynamic power for another set/cluster of logic. Consequently, the total dynamic power can be expressed as $$P_{dyn} = V^2 \Sigma_p [f_{eff,p} N_p C_{eff,p} + \Sigma_i f_{i,p} \alpha_{i,p} C_{i,p}] + V^2 \Sigma_i \cdot [f_i \alpha_i C_i + \Sigma_p f_{eff,p,i} N_{p,i} C_{eff,p,i}] \qquad \text{Equation (4):}$$

Using this method recursively would significantly reduce the computational complexity of calculating the dynamic power. These nested equations can then be generically represented as $$v_n = \sum_r Y_r \sum_q X_{q,r} \sum_k A_k W_{k,q,r} \qquad \text{Equation (5)}$$

Equation (5) indicates that the dynamic power calculation can be represented as a series of multiply and addition operations. Accordingly, the dynamic power can be represented as a network of operations, where every node is a MADD circuit. The inputs $A_k$ can be either the activities a or number of cells, $N_i$. The weight set (W, X, Y) would then effectively represent the remaining terms such as capacitance, voltage in equation (4). Activities of specific nodes and number of logic gates in a pre-defined cell type are fed as inputs to this network.

Figure 9:
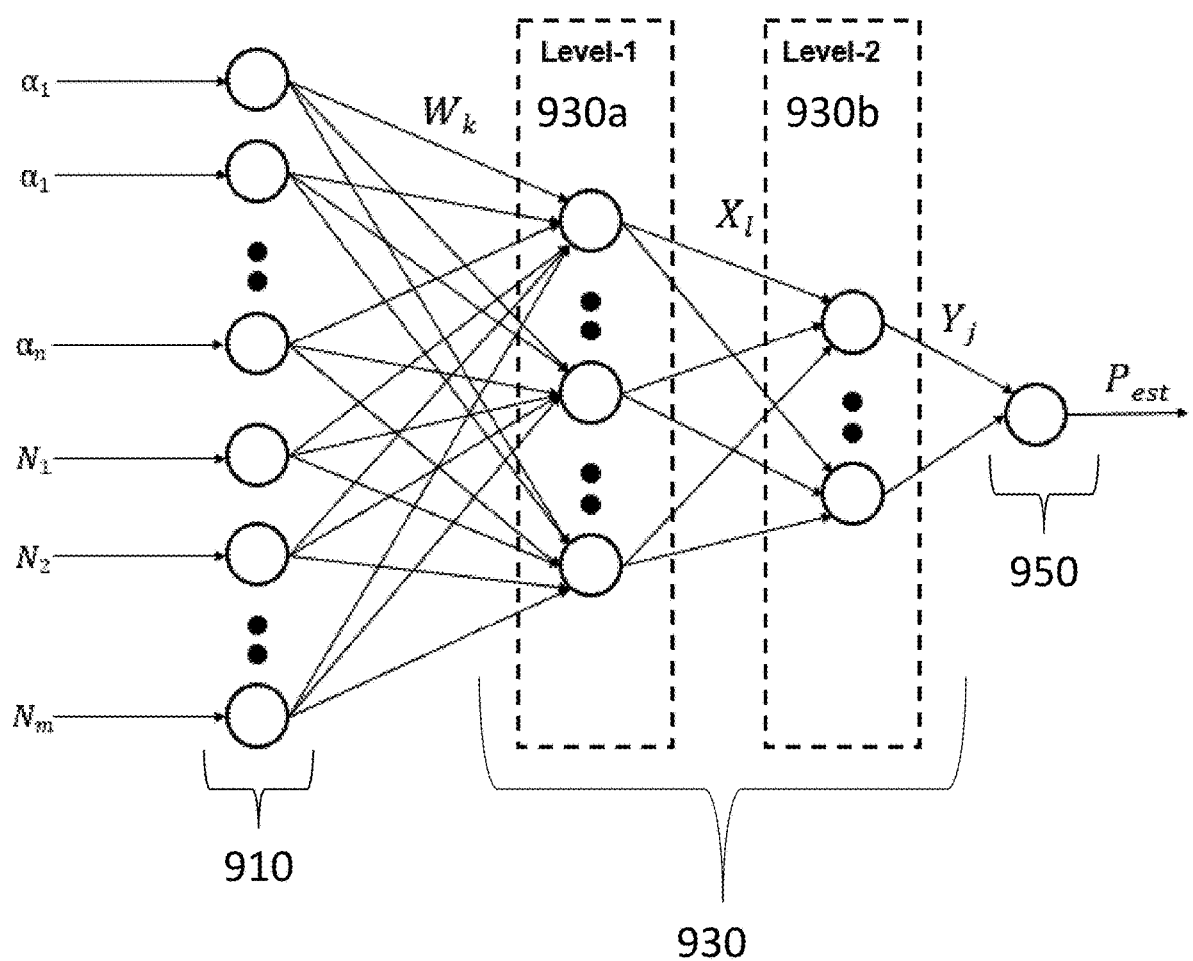
FIG. 9 shows an exemplary hardware power estimator (HPE) neural network according to at least one exemplary embodiment of the present disclosure.

FIG. 9 shows an exemplary representation of a hardware power estimator (HPE) neural network 900 that can be hardware implementation of equation 5.

The HPE neural network 900 includes an input or input layer 910 that receives input in the form of number of activities and/or active cells of the MCU for which power is to be estimated. This information may be obtained from application code or registers of the MCU.

The output layer 950 provides data or values representing the current power consumption. The input layer 910 coupled to the output layer 950 through one or more levels or intermediate layers 930. As shown, the layers can be related through weighted connections, respectively using the $W_k$, $X_l$, and $Y_j$.

In various embodiments, different possible approaches for physically constructing the HPE neural network 900. In one example, a hierarchical approach, the intermediate layer Level-1 nodes could be realized or implemented by MADD circuits. The MADD circuits can be configured or defined so that their outputs would be similar to dynamic power numbers. Further, level-2 nodes could also be realized or implemented with MADD circuits and their outputs could represent a sub-system or a particular IUPI dynamic power consumption.

Dynamic power numbers (e.g., measured in lab) can be in milliAmperes (mA). In simulation tools, the dyanmic power numbers can be measured as activity numbers (e.g., on a scale of 0 to 1). With MADD circuits, dynamic power numbers can be represented as digital values. For example, for a 2 bit MADD circuit: 00 corresponds to 0 to 10 mA, 01 corresponds to 10 to 20 mA, 10 corresponds to 20 to 30 mA, 11 corresponds to 30 to 40 mA.

In another example, the HPE could be realized using a flat network approach. In such a case, the Level-1 or 2 nodes could be realized with MADD circuits but these nodes do not represent any specific cluster or subcomponent. Instead the values or output of these nodes or neurons of Level-1 or Level-2 could be used to increase accuracy of the estimation.

Referring, back to equations (4) and (5), a simple linear equation would work well for each node. Therefore, the following function can be used for training the model for HPE:

$$y = \max(0, x) \qquad \text{Equation (6):}$$

For simple linear regression, it can be shown that, the minimum set of training dataset required to arrive at one potential weight set (W, X, Y) is $$(n+m)^{5/3} + (n+m) + (n+m)^{1/3}.$$

However, performing training to arrive at a proper or suitable weighted set could be accomplished using a loss function to maximize accuracy. For example, a loss function representing the least mean squared (LMS) error of power estimation of set a leaf cells could be used. As equation (5) is a multivariate non-linear polynomial, typically the training dataset is 5-10 times above the required number and a modified gradient descent algorithm is used for optimizing the weights.

It is noted that not all the application codes used in this training set need to be functional (in terms of functionality). During a pre-silicon analysis, a vector driven approach could be used to attain higher coverage of internal nodes. Therefore, a set of patterns (or codes) are used to estimate activity of the logic using simulation or emulation. A Fast Signal Database (FSDB) captures all the node/signal activities and used as an input to industry standard power estimation tools (e.g., PrimePower™ from Synopsys®, Voltus™ from Cadence®, etc). As discussed later, the power consumption ($I_{meas}$) obtained from these tools can be compared against the estimated power consumption $I_{est}$ from a realized or implemented HPE. A learning algorithm can be used to minimize the LMS loss function so as to arrive at optimized weights for the HPE.

As previously described, for the HPE neural network, simple Multiply and Add circuits (MADD circuits) can be used to estimate the current for IPs of a MCU. For example, assuming that each stage is represented by the equation X*K1+C1, then the 3 stage Network can be represented by the equation:

$$((X*k1+c1)*k2+c2)*k3+c3 = X*k1*k2*k3 + C1*k2*k3 + C2*k3 + C3 \qquad \text{Equation (7):}$$

In equation (7), X represents the number of instances of an IP and k1 represents the average current consumed by the IP while C1 represents the leakage contribution of the IP.

Accordingly, in one or more exemplary embodiments of the present disclosure, MADD circuits can be configured to represent the dynamic power consumption of components (e.g., IPs) of, or an entire microcontroller, such as the MCU 10 of FIG. 1.

Figure 10:
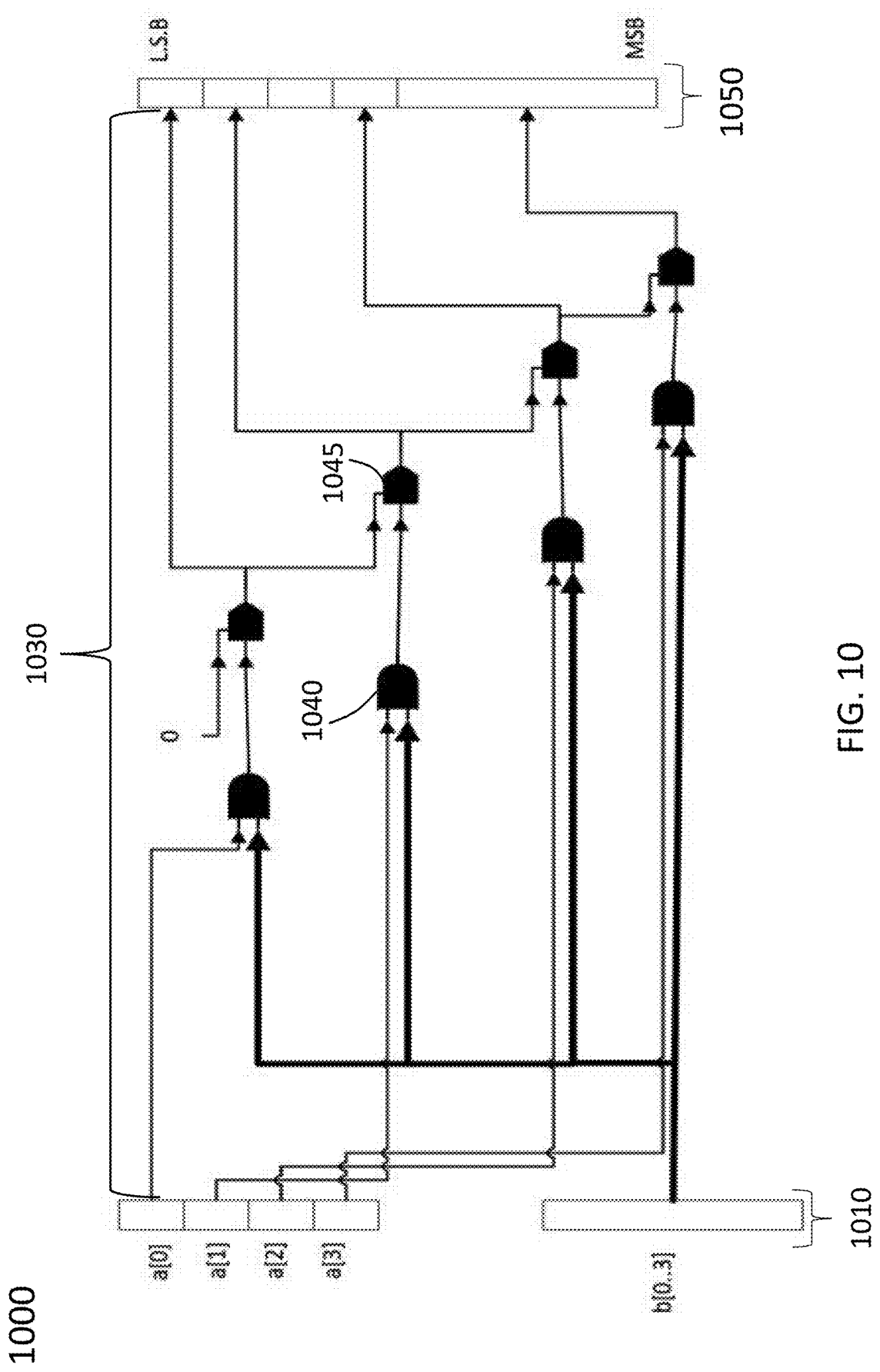
FIGS. 10-11 shows exemplary multiply and add (MADD) circuits according to at least one exemplary embodiment of the present disclosure.

FIG. 10 shows one example of a MADD circuit 1000 according to at least one exemplary embodiment of the present disclosure. The MADD circuit 1000 can be considered being a single stage. Hence, the MADD circuit 1000 includes an input or input layer 1010 coupled to an output or output layer 1050 via a single stage or intermediate level 1030.

In this example, the input or input layer 1010 can have or include two (different) inputs or input vectors, namely a (a[0 ... 3]) and b (b[0 ... 3]. The input vector a can represent input, e.g., indicating activities and/or the number of active cells or circuits. In one example, the each cell or circuit can correspond to a group of logic gates for implementing a state machine, protocol logic, and the like, to name a few.

The input vector b can be the trained and optimized weighted set of values. The inputs can be obtained from or located in application code or registers of the MCU.

The MADD circuit 1000 can perform multiplication of 2×4-bit numbers in a single clock cycle. The single stage 1030 of the MADD circuit 1000 includes multipliers 1040 and adders 1045 that are connected to determine the output for the node. The output or output layer 1050 can include values indicating the dynamic power consumption or dynamic current used for a particular individual component or IP of a MCU. The output for the MADD circuit 1000 can be produced in one clock cycle.

Figure 11:
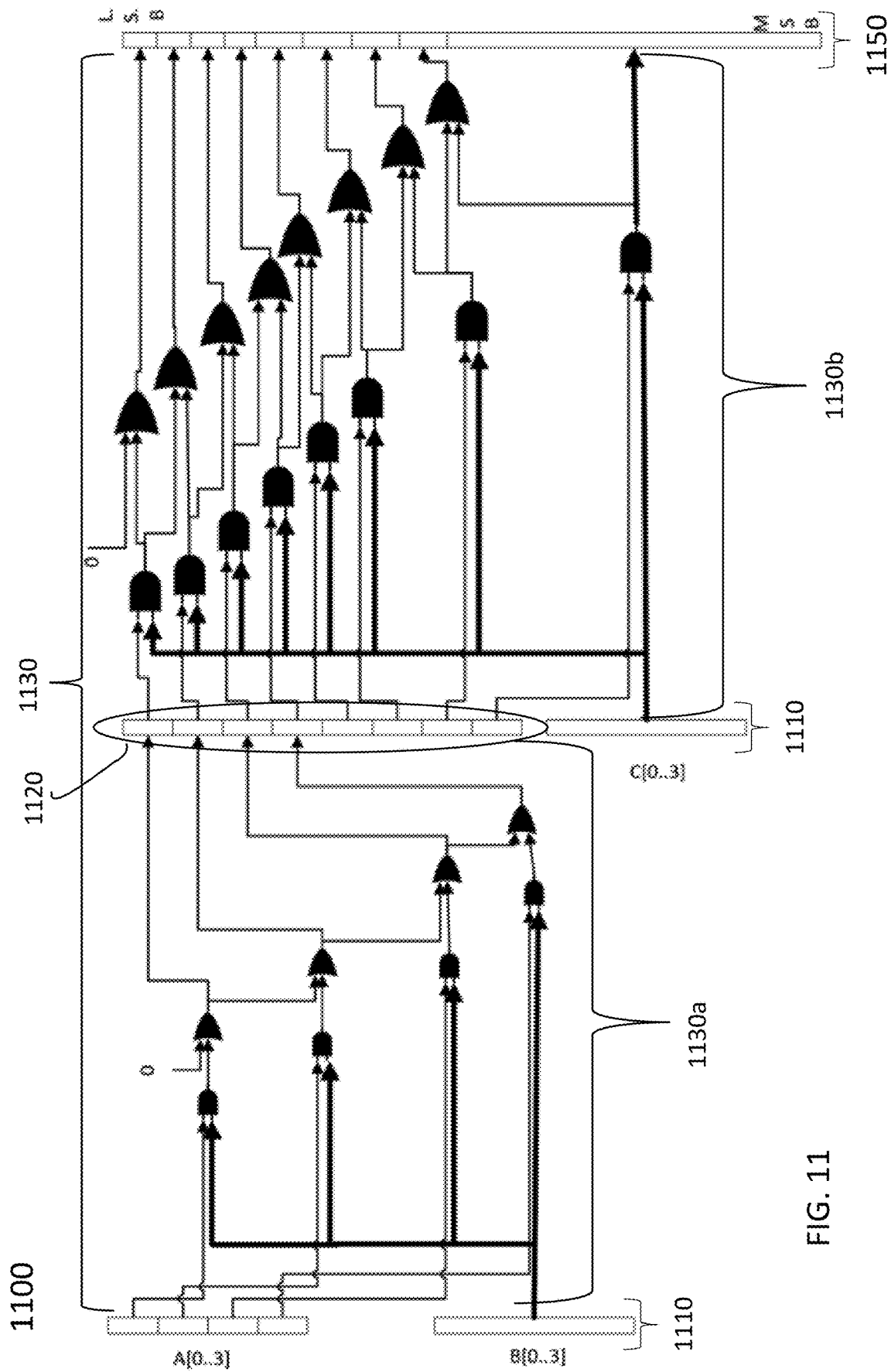

FIG. 11 shows another MADD circuit 1100 according to at least one exemplary embodiment of the present disclosure. Again the MADD circuit 1100 can be used for a HPEs described herein.

The MADD circuit 1100 includes an input or input layer 1110 and an output or output layer 1050. In this case, the input layer 1110 can have or include two (different) inputs or input vectors, namely a (a[0 ... 3]) and b (b[0 ... 3]). The input vector a can represent input, e.g., indicating activities and/or the number of active cells. The input or input vector b can be the trained weighted set of values.

Since the MADD circuit 1100 has two stages, an addition input, input or input vector c is also present to be provided for the second stage 1130b. Each stage of the MADD circuit 1100 can be configured and include components, e.g., multipliers and adders, similar to the single stage 1030 of FIG. 10. The input c (c[0 . . . 3]) can also include a weighted set of values to be provided and used for the second stage 1130b of the MADD circuit 1100. That is, the first and second inputs, or input a and input b are used for the first stage, 1130a, the first output or the output of the first stage, 1120, can be used as input for the second stage 1130b.

Accordingly, the first output 1120 and the input c thus are used in the second stage to produce an output 1150 for the MADD circuit 1100 and the corresponding node represented by the MADD circuit 1100.

The output 1150 can correspond to the dynamic power consumption for at least one component or IP of microcontroller (e.g., MCU 10) or a SoC. As shown, the MADD circuit 1100 can perform so as to produce the output 1150 in two clock cycles.

In short, the MADD circuit 1100 replicates the MADD circuit 1000 to realize 3-input multiplication, which can be produced or achieved in 2 clock cycles. Extending this concept, a multi-stage MADD circuit could further be realized to process 4-input multiplication that can be achieved in 3 clock cycles.

Figure 12:
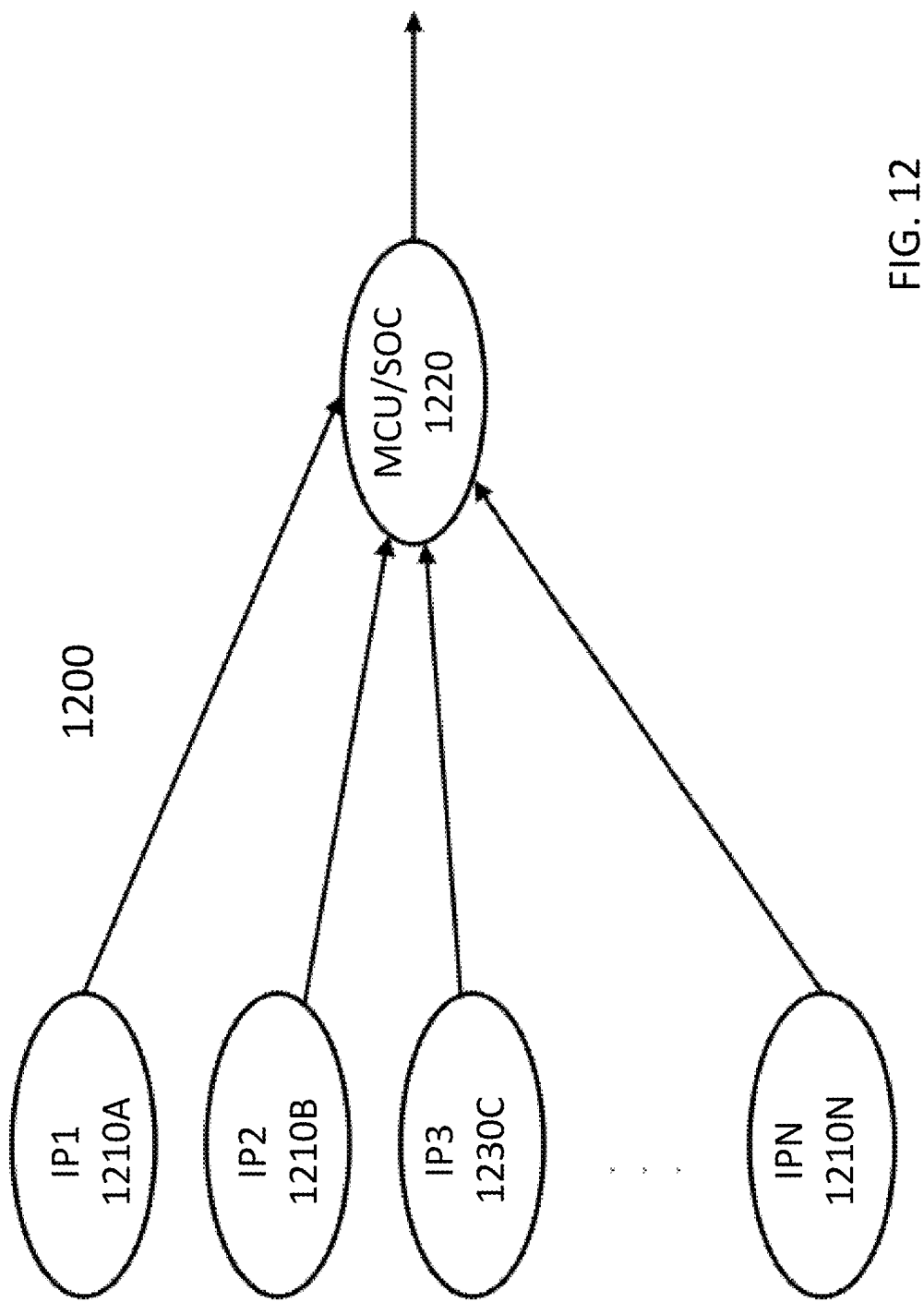
FIG. 12 shows an exemplary representation of a hardware power estimator according to at least one exemplary embodiment of the present disclosure.

FIG. 12 shows an exemplary representation of a HPE 1200 configured to estimate power consumption for a MCU or SoC. The HPE 1200 is hardware neural network configured to estimate the instant or dynamic power consumption for components, specifically, IPs of a MCU or SoC. For example, the HPE 1200 may be implemented in an MCU, including exemplary MCUs described herein.

As such, the HPE 1200 may be realized a hardware neural network with including nodes in the form of MADD circuits described herein (e.g., MADD circuits 1100 and 1200). Thus, the nodes or MADD circuits can be implemented as in single or multi-stage form.

In the HPE 1200 of FIG. 12, each node or MADD circuit corresponds to a particular component or IP, e.g., of a MCU or SoC. Namely the HPE 1200 includes nodes 1210A-1210N, which correspond and are configured to determine power consumption for IPs, IP1-1PN of a MCU.

A final node or MADD circuit 1220 can be configured to determine an overall dynamic power consumption for the SoC or MCU. As shown, the estimated power consumption or current consumptions for the IPs (IP1-IPN) can be done at or at substantially the same time, concurrently or in parallel.

In general, as long as the hardware supports the number of gates required for higher number of MADD stages for all IPs, the current estimation for the entire SoC can be done in the order of few clock cycles. Thus, in effect, an entire network or HPE can be implemented to estimate power consumption for a MCU or SoC in less than 6 clock cycles because the power estimation from different MADD circuits for all the IPs or components can done concurrently or in parallel.

Further, HPEs described herein, e.g., using multi-level MADD nodes can estimate power with finer granularity (by capturing higher number of inputs). For example, a HPE may be realized so estimating power consumption for a given IP, up to 3 levels or stages of MADD nodes may be used. Further, the HPE may be configured or realized so that the power consumption of each IP may be estimated concurrently or in parallel. Thus, the HPE for a SoC or MCU can be considered as a set of IP level HPEs, where each of these IP level HPEs can be realized using a MADD circuit/nodes.

An increase in the number of the levels, however can lead to an increase in the estimation latency. However, this latency increase can be compensated by a corresponding the increase in accuracy of the estimated power.

Figure 13:
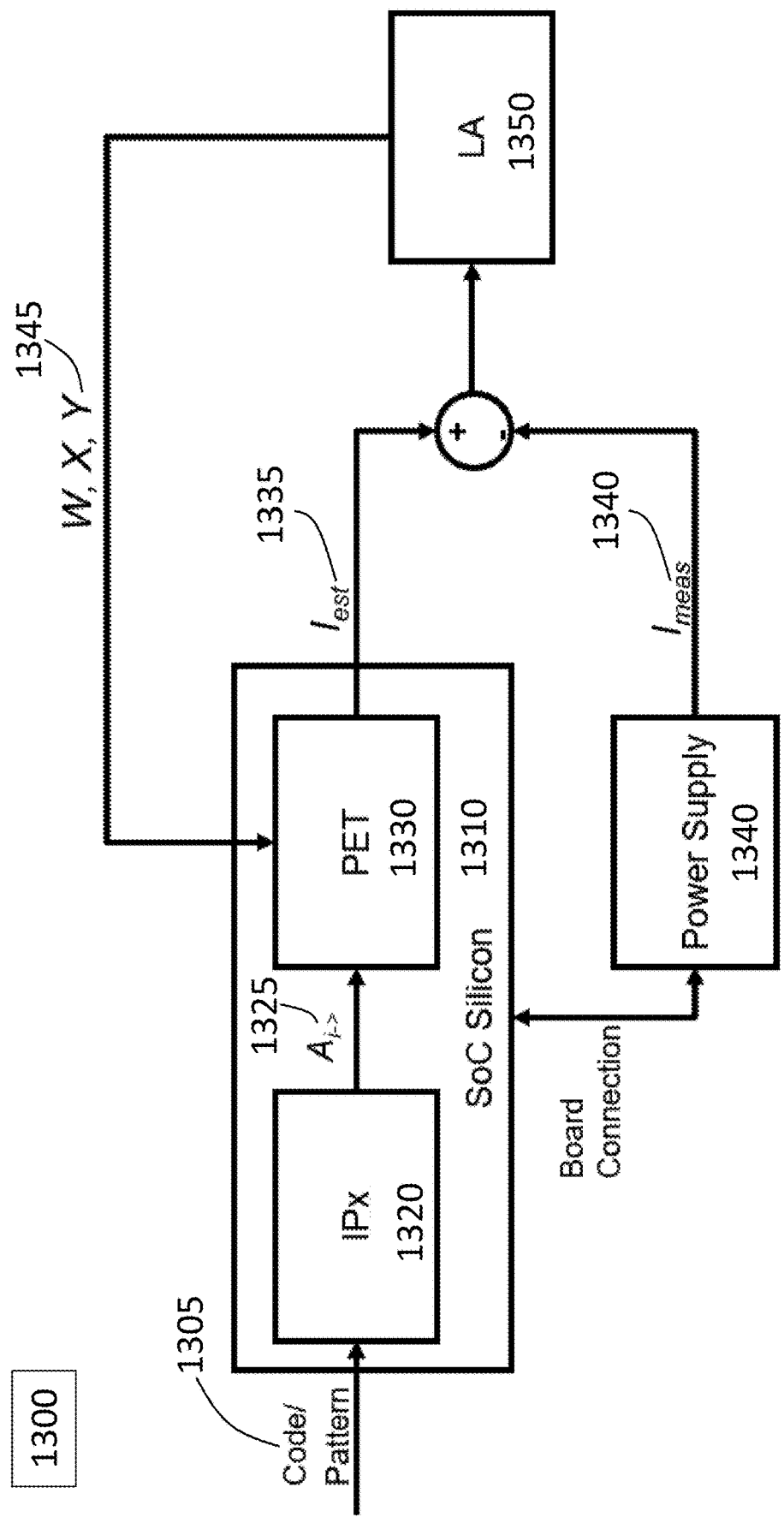
FIG. 13 shows an exemplary flow diagram and environment for a post-silicon training process for determining the weights or weighted set of values for hardware power estimator according to at least one exemplary embodiment of the present disclosure.

FIG. 13 shows an exemplary flow diagram and environment 1300 representing exemplary a post-silicon training process for determining the weights or weighted set of values to be used for HPEs or parts thereof described herein.

For post silicon training, an HPE 1310 is already implemented as part of silicon or the MCU 1310. Thus, the HPE 1310 is operable to estimate power consumption of an IP or application of a MCU, such as any IP, which is denoted IPX 1320 in this example.

The MCU or SoC 1310 can be provided input, e.g., code or input patterns 1305 which causes the at least one IPx 1320 to operate or function. The corresponding parameters produced by the IPx 1320, e.g., the number of active cells, can be captured and used as input to the HPE 1330. Thus, the HPE 1330 can produce an output, e.g., an estimated power consumption. This may be in the form of an estimated current Iest, 1335 for example. The HPE 1330 may have been already configured or set with initial values for the weighted set 1345 (Wi, $X_j$, $Y_j$), which can be stored in registers of the MCU. Again, the HPE 1310 can provide an estimate of the power consumption with very low latency. Relatively fast or faster transients or changes in the power consumption can be dynamically estimated.

FIG. 13 shows the estimated power 1335 compared against the real power consumption 1340, which is measured using a power supply 1340. The power supply 1340 can be supply power to the device under test (DUT), e.g., the SoC or MCU 1310.

The difference between the measured power 1340 and the estimated power 1335 from the HPE 1330 can be used as input by a learning algorithm (LA) 1350. The learning algorithm can be implemented as instructions (e.g., stored on non-transitory computer readable medium) and executed by one or more processors, e.g., on a separate computing device. The LA 1350 uses current weights 1345 and the differences in the power measurements between the directly measured and estimated power consumption to determine optimized weights 1345 to be used by the HPE 1330. In particular, the LA 1350 can be configured to determine an optimized set of weights 1345. Any suitable (machine) learning algorithm or techniques can be used to find optimized weights 1345. In one example, the LA 1350 can use a least means square (LMS) loss function and arrive at optimized weights for the HPE 1330.

Figure 14:
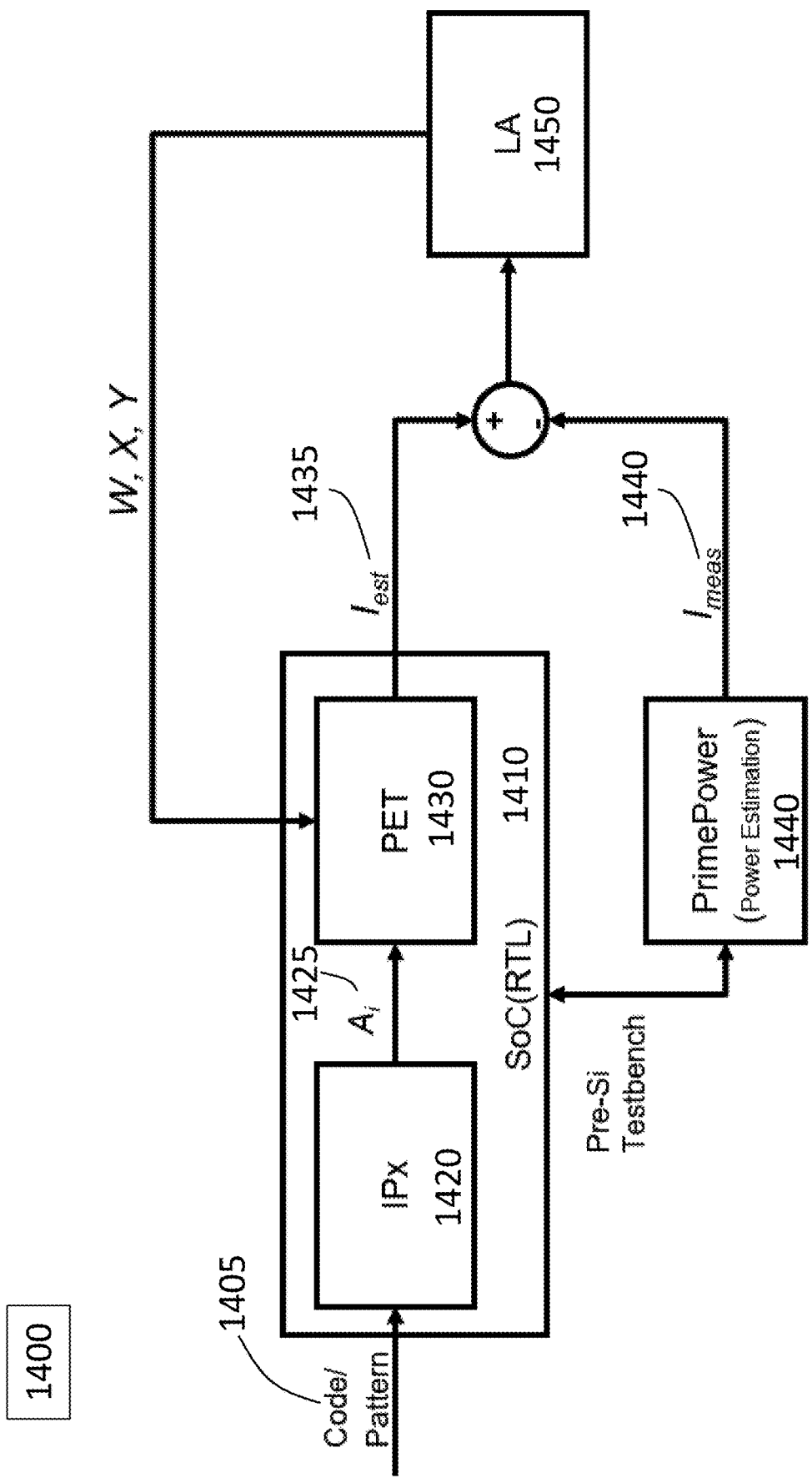
FIG. 14 shows an exemplary flow diagram and environment for a pre-silicon training process for determining the weights or weighted set of values for hardware power estimator according to at least one exemplary embodiment of the present disclosure.

FIG. 14 shows an exemplary flow diagram and environment 1400 representing an exemplary a pre-silicon training process for determining weights or weighted set of values for HPEs described herein. For a pre-silicon training process, an SoC/MCU 1410 and its components, e.g., IPx 1420, and HPE 1430 is not physically realized and implemented. Instead the SoC/MCU 1410 can be represented as abstract data form for simulation data, e.g., data used for RTL simulation or similar types of simulations.

During simulations different inputs, e.g., codes or patterns, can be input to the simulated SoC/MCU 1410 and thus can cause one or more operations or tasks from the IPx 1410 to be implemented. As in the post-silicon training, the simulated HPE 1410 can produce output of an estimate power consumption. That is, the parameters produced by the IPx 1420, e.g., the number of active cells, can be captured and used as input to the HPE 1430. Again, the power consumption may be in the form of an estimated current Iest, 1435 for example. Similarly, the HPE 1430 may be simulated with initial values for the weighted set 1345 (Wi, $X_j$, $Y_l$) used for the HPE 1330, which can be updated for later simulation by the weights determined by the LA 1450.

Again, the estimated power consumption 1335 can be compared against the power consumption 1340 produced by simulated power estimator 1440, which can also be a simulated power supply to the SoC/MCU 1410.

As with the post-silicon phase, the difference between the simulated measured power 1440 and the simulated estimated power 1435 from the HPE 1330 can be used by a learning algorithm (LA) 1450 to find optimized weight value.

Again, the LA 1450 can be implemented as instructions (e.g., stored on non-transitory computer readable medium) and executed by one or more processors, e.g., on a separate computing device. As the LA 1450 receives the differences in power measurements, as well as the current set of weights 1445. Using such input, the LA 1350 can be configured to determined optimized weight set 1345. The LA 1350 can use a least means square (LMS) loss function and arrive at optimized weights for the HPE 1330. The LA can be repeatedly or iteratively applied to multiple simulation to update or find the best or optimized set of weights that produce the least error in power consumption produced by the simulated HPE 1430 measuring power consumption. Further, since the HPE is not physically realized, the HPE 1430 can itself be repeatedly optimized or its design or configuration updated accordingly in order to determine a proper result.

The HPEs described in the present disclosure can be used along with other software and debug tools to predict power consumption for a given application code, and thereby helping optimize application code in an efficient manner. Thus, early information is available for design and architecture teams for planning the silicon parameters.

The following examples pertain to further aspects of this disclosure:

Example 1 is a microcontroller powered by a power management integrated circuit (PMIC), the microcontroller including: a plurality of cores including a first core configured to implement a system power transient management component, one or more second cores configured to implement one or more applications;
wherein the system power transient management component implemented by the first core of is configured to: dynamically identify an expected load transient event to occur in the microcontroller, determine power control data to optimize a response to the identified expected load transient event, the power control data comprising a power control mode and associated parameters, and provide the power control data to the power management integrated circuit (PMIC).

Example 2 is the subject matter of Example 1, wherein the PMIC can be configured to dynamically change operation of the PMIC according to the provided power control data.

Example 3 is the subject matter of Example 1 or 2, wherein the system power transient management component can be further configured to select a power control mode from at least two of the following: a current mode, a feed-forward mode, a hysteretic mode, a voltage mode.

Example 4 is the subject matter of any of Examples 1 to 3, wherein the associated parameters can include loop parameters for the power control mode.

Example 5 is the subject matter of any of Examples 1 to 4, wherein the associated parameters can include voltage and frequency parameters for the PMIC.

Example 6 is the subject matter of any of Examples 1 to 5, wherein the identified expected load transient event can inclde a transient droop.

Example 7 is the subject matter of any of Examples 1 to 6, wherein the identified expected load transient event can include a power surge.

Example 8 is the subject matter of any of Examples 1 to 7, wherein to determine the power control data to optimize the transient load response can include to: identify a scenario from a plurality of predefined scenarios corresponding to the identified load transient event, determine, based on the determined scenario, one or more activities expected to occur based on the determined scenario, determine a dynamic current consumption profile comprising determining, based on the one or more determined activities, an estimated power consumption for each activity, obtain runtime data for the one or more applications and update the dynamic current consumption profile based on runtime data, determine the power control data based on the updated dynamic current consumption profile.

Example 9 is the subject matter of Example 8, wherein the plurality of predefined scenarios can be stored in a plurality of hardware registers of the microcontroller, wherein each of the plurality of predefined scenarios indicates one or more activities that can be executed by the one or more applications.

Example 10 is the subject matter of any of Example 8, wherein to determine the dynamic current consumption profile can include to apply a power model to the one or more determined activities.

Example 11 is the subject matter of Example 10, wherein to determine the power control data can include to apply a look-up-table to the updated dynamic current consumption profile.

Example 12 is the subject matter of Example 8, wherein to determine the power control data can include to select one power control mode from a plurality of predefined power control modes, the plurality of predefined power control modes including at least two of the following: a current mode, a feed forward mode, a hysteretic mode, a voltage mode.

Example 13 is the subject matter of any of Example 12, wherein to determine the power control data can further include to select at least one set of associated parameters for the selected power control mode, wherein the at least one set of associated parameters are selected from the following: a group of voltage, frequency and loop parameters.

Example 14 is the subject matter of any of Example 11, wherein the determined power control data can include a power control mode that is the same as a current or predecessor power control mode and further comprises at least one set of associated parameters are different from a set of associated parameters for the current or predecessor power control mode.

Example 1A is a method of power management for a microcontroller, the method can include: implementing, by a first core of the microcontroller, a system power transient management component; implementing, by one or more second cores of the microcontroller, one or more applications; wherein implementing by the first core of the system power transient management component comprises the system power transient management component:
dynamically identifying an expected load transient event to occur in the microcontroller, determining power control data to optimize a response to the identified expected load transient event, the power control data comprising a power control mode and associated parameters, and providing the power control data to a power management integrated circuit (PMIC).

Example 2A is the subject matter of Example 1, which can further include dynamically change operation of the PMIC, by the PMIC, according to the provided power control data.

Example 3A is the subject matter of Example 1A or 2A, which can further inculde selecting, by the system power transient management component, a power control mode from at least two of the following: a current mode, a feed-forward mode, a hysteretic mode, a voltage mode.

Example 4A is the subject matter of any of Examples 1A to 3A, wherein the associated parameters can include loop parameters for the power control mode.

Example 5A is the subject matter of any of Examples 1A to 4A, wherein the associated parameters can include voltage and frequency parameters for the PMIC.

Example 6A is the subject matter of any of Examples 1A to 5A, wherein the identified expected load transient event can include a transient droop.

Example 7A is the subject matter of any of Examples 1A to 6A, wherein the identified expected load transient event can include a power surge.

Example 8A is the subject matter of any of Examples 1A to 7A, wherein determining power control data to optimize the transient load response can include: identifying a scenario from a plurality of predefined scenarios corresponding to the identified load transient event, determining, based on the determined scenario, one or more activities expected to occur based on the determined scenario, determining a dynamic current consumption profile comprising determining, based on the one or more determined activities, an estimated power consumption for each activity; obtaining runtime data for the one or more applications and update the dynamic current consumption profile based on runtime data; and determining the power control data based on the updated dynamic current consumption profile.

Example 9A is the subject matter of Example 8A, wherein the plurality of predefined scenarios can be stored in a plurality of hardware registers of the microcontroller, and wherein each of the plurality of predefined scenarios can indicate one or more activities that can be executed by the one or more applications.

Example 10A is the subject matter of Example 8A, wherein determining the dynamic current consumption profile can include applying a power model to the one or more determined activities.

Example 11A is the subject matter of Example 10A, wherein determining the power control data can include applying a look-up-table to the updated dynamic current consumption profile.

Example 12A is the subject matter of Example 8A, wherein determining the power control data can include selecting one power control mode from a plurality of predefined power control modes, the plurality of predefined power control modes including at least two of the following: a current mode, a feed forward mode, a hysteretic mode, a voltage mode.

Example 13A is the subject matter of Example 12A, wherein determining the power control data can further include selecting at least one set of associated parameters for the selected power control mode, wherein the at least one set of associated parameters can be selected from the following: a group of voltage, frequency and loop parameters.

Example 14A is the subject matter of Example 11A, wherein determining the power control data can include selecting the power control mode that is the same as a current or predecessor power control mode and can further include selecting the at least one set of associated parameters that are different from a set of associated parameters for the current or predecessor power control mode.

Example 1B is a hardware power estimator circuit for estimating power of an electronic device providing a plurality of (Intellectual Property) IP blocks, the hardware power estimator including: a hardware artificial neural network comprising a plurality of interconnected nodes arranged in one or more stages, wherein each individual stage includes:

a first input layer including values indicating activities of the electronic device and/or indicating active cells of the electronic device, a second input layer including a weighted set of values, an output layer including values calculated for the individual node stage, at least one intermediate layer situated between the input layer and the output layer, wherein each node of the at least one intermediate layer comprises a multiply and adder (MADD) circuit configured to calculate a value for the respective node using values received from the first and second input layers.

Example 2B is the subject matter of Example 1B, wherein the hardware artificial neural network can include one or more single individual stages, and the output layer of each single individual stage can include values indicating a power estimation for one or more of plurality of IP blocks.

Example 3B is the subject matter of Examples 1B or 2B, wherein the hardware artificial neural network can include one or more multiple stages, each multiple node stage comprising a plurality of individual stages arranged in series so that the output layer of a non-final stage of the multiple stage serves as the first input layer for a following individual stage of the multiple stage, and wherein the output layer a final individual stage can include values indicating a power estimation for one or more of the plurality of IP blocks of the electronic device.

Example 4B is the subject matter of any of Examples 1B to 3B, wherein the hardware artificial neural network can include a plurality of stages configured to operate in parallel and concurrently.

Example 5B is the subject matter of any of Examples 1B to 4B, wherein the weighted set of values can correspond to one or more electrical parameters of the electronic device.

Example 6B is the subject matter of Example 5B, wherein the one or more electrical parameters can include one or more frequencies and/or one or more capacitances.

Example 7B is the subject matter of any of Examples 1B to 6B, wherein the weighted set of values are values that can be determined from a training process.

Example 8B is the subject matter of Example 7B, wherein the training process can include a process performed prior to fabrication of the electronic device, the process including providing simulated input from a simulated hardware electronic device to the hardware power estimator, determining a simulated power measurement, and applying a learning algorithm to difference between power estimate from hardware power estimator and simulated power measurement to derive an optimized weighted set.

Example 9B is the subject matter of Example 7B, wherein the training process can include a process performed subsequent to fabrication of the electronic device, the processing including providing input from a fabricated hardware electronic device to the hardware power estimator, measuring power using a power supply coupled to the fabricated hardware electronic device, and applying a learning algorithm to a difference between power estimate from hardware power estimator and measured power from the power supply to derive an optimized weighted set.

Example 10B is the subject matter of any of Examples 1B to 9B, wherein the first and second input layer can include a plurality of registers storing the values of the first and second input layer.

Example 11B is the subject matter of any of Examples 1B to 10B, wherein the output layer can inlcude a plurality of registers storing the values of the output layer.

Example 12B is the subject matter of any of Examples 1B to 11B, wherein the artificial neural network can be configured to provide a power estimate in real time.

Example 13B is the subject matter of any of Examples 1B to 12B, wherein each stage of the neural network can be configured to operate in one clock cycle. Example 1C is a microcontroller including a plurality of (Intellectual Property) IP blocks each configured to perform one or more functions; a hardware power estimator circuit for estimating power of the microcontroller, the hardware power estimator including: a hardware artificial neural network inlcuding a plurality of interconnected nodes arranged in one or more stages, wherein each individual stage including:
a first input layer including values indicating activities of the electronic device and/or indicating active cells of the electronic device, a second input layer including a weighted set of values, an output layer including values calculated for the individual node stage, at least one intermediate layer situated between the input layer and the output layer, wherein each node of the at least one intermediate layer comprises a multiply and adder (MADD) circuit configured to calculate a value for the respective node using values received from the first and second input layers.

It should be noted that one or more of the features of any of the examples above may be suitably or appropriately combined with any one of the other examples or with embodiments disclosed herein.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:
1. A microcontroller comprising:
a plurality of (Intellectual Property) IP blocks each configured to perform one or more functions;
a hardware power estimator circuit for estimating power of the microcontroller, the hardware power estimator including:
a hardware artificial neural network including a plurality of
interconnected nodes arranged in one or more stages, wherein each individual stage comprises:
a first input layer including values indicating activities of the microcontroller and/or indicating active cells of the microcontroller;
a second input layer including a weighted set of values;
an output layer including values calculated for the individual node stage;
at least one intermediate layer situated between the input layer and the output layer;
wherein each node of the at least one intermediate layer comprises a multiply and adder (MADD) circuit that is configured to calculate a value for the respective node using values received from the first and second input layers.

2. The microcontroller of claim 1, wherein the hardware artificial neural network comprises one or more single individual stages, and the output layer of each single individual stage comprises values indicating a power estimation for one or more of the plurality of IP blocks.

3. The microcontroller of claim 1, wherein the hardware artificial neural network comprises one or more multiple node stages, each multiple node stage comprising a plurality of individual stages arranged in series so that the output layer of a non-final stage of the multiple stage serves as the first input layer for a following individual stage of the multiple stage, and wherein the output layer a final individual stage comprises values indicating a power estimation for the one or more of the plurality of IP blocks.

4. The microcontroller of claim 1, wherein the hardware artificial neural network comprises a plurality of stages configured to operate in parallel and concurrently.

5. The microcontroller of claim 1, wherein the weighted set of values corresponds to one or more electrical parameters of the microcontroller.

6. The microcontroller of claim 5, wherein the one or more electrical parameters comprises one or more frequencies and/or one or more capacitances.

7. The microcontroller of claim 1, wherein the weighted set of values are values that are determined from a training process.

8. The microcontroller of claim 7, wherein the training process comprises a process performed prior to fabrication of the microcontroller, the process comprising providing simulated input from a simulated hardware electronic device to the hardware power estimator, determining a simulated power measurement, and applying a learning algorithm to a difference between a power estimate from the hardware power estimator and the simulated power measurement to derive an optimized weighted set.

9. The microcontroller of claim 7, wherein the training process comprises a process performed subsequent to fabrication of the electronic device, the processing comprising providing input from a fabricated microcontroller to the hardware power estimator, measuring power using a power supply coupled to the fabricated hardware electronic device, and applying a learning algorithm to a difference between a power estimate from the hardware power estimator and measured power from the power supply to derive an optimized weighted set.

10. The microcontroller of claim 1, wherein the first and second input layer comprise a plurality of registers storing the values of the first and second input layer.

11. The microcontroller of claim 1, wherein the output layer comprises a plurality of registers storing the values of the output layer.

12. The microcontroller of claim 1, wherein the artificial neural network is configured to provide a power estimate in real time.

13. The microcontroller of claim 1, wherein each stage of the neural network can be configured to operate in one clock cycle.

14. A method of power management for a microcontroller, comprising:
implementing, by a first core of the microcontroller, a system power transient management component;
implementing, by one or more second cores of the microcontroller, one or more applications;
wherein implementing by the first core of the system power transient management component comprises the system power transient management component:
dynamically identifying an expected load transient event to occur in the microcontroller;
determining power control data to optimize a response to the identified expected load transient event, the power control data comprising a power control mode and associated parameters; and
providing the power control data to a power management integrated circuit (PMIC).

15. The method of claim 14, wherein the identified expected load transient event comprises a transient droop or a power surge.

16. A hardware power estimator circuit for estimating power of an electronic device providing a plurality of (Intellectual Property) IP blocks, the hardware power estimator comprising:
a hardware artificial neural network comprising a plurality of interconnected nodes arranged in one or more stages, wherein each individual stage comprises:
a first input layer including values indicating activities of the electronic device and/or indicating active cells of the electronic device;
a second input layer including a weighted set of values;
an output layer including values calculated for the individual node stage;
at least one intermediate layer situated between the input layer and the output layer;
wherein each node of the at least one intermediate layer comprises a multiply and adder (MADD) circuit configured to calculate a value for the respective node using values received from the first and second input layers.

17. The hardware power estimator circuit of claim 16, wherein the weighted set of values corresponds to one or more electrical parameters of the electronic device; wherein the one or more electrical parameters comprises one or more frequencies and/or one or more capacitances.

18. The hardware power estimator circuit of claim 16, wherein the weighted set of values are values that are determined from a training process.

19. The hardware power estimator circuit of claim 18, wherein the training process comprises a process performed prior to fabrication of the electronic device, the process comprises providing simulated input from a simulated hardware electronic device to the hardware power estimator, determining a simulated power measurement, and applying a learning algorithm to difference between power estimate from hardware power estimator and simulated power measurement to derive an optimized weighted set.

20. The hardware power estimator circuit of claim 18, wherein the training process comprises a process performed subsequent to fabrication of the electronic device, the processing including providing input from a fabricated hardware electronic device to the hardware power estimator, measuring power using a power supply coupled to the fabricated hardware electronic device, and applying a learning algorithm to a difference between power estimate from hardware power estimator and measured power from the power supply to derive an optimized weighted set.

* * * * *